United States Patent [19]

Yoshimura et al.

[11] Patent Number: 5,761,087

[45] Date of Patent: Jun. 2, 1998

[54] COORDINATE INPUT DEVICE AND A CONTROL METHOD THEREFOR

[75] Inventors: Yuichiro Yoshimura, Kamakura; Atsushi Tanaka, Yamato; Ryozo Yanagisawa, Inzai; Katsuyuki Kobayashi, Yokohama; Masaki Tokioka, Fujisawa; Hajime Sato, Yokohama, all of Japan

[73] Assignee: Canon Kabushiki Kaisha, Tokyo, Japan

[21] Appl. No.: 777,248

[22] Filed: Dec. 31, 1996

[30] Foreign Application Priority Data

Jan. 10, 1996 [JP] Japan ................................. 8-001974
Jun. 6, 1996 [JP] Japan ................................. 8-144211

[51] Int. Cl.$^6$ ................................................. G08C 21/00
[52] U.S. Cl. ........................... 364/508; 178/18; 178/19; 367/907
[58] Field of Search ..................... 364/508, 560, 364/561, 571.01, 571.02; 178/18, 19, 20; 345/177, 178, 179; 367/129, 907

[56] References Cited

U.S. PATENT DOCUMENTS

| | | | |
|---|---|---|---|
| 5,070,325 | 12/1991 | Tanaka et al. | 345/179 |
| 5,352,856 | 10/1994 | Tanaka et al. | 178/18 |
| 5,362,930 | 11/1994 | Yoshimura et al. | 178/18 |
| 5,539,160 | 7/1996 | Tokioka et al. | 128/19 |
| 5,565,893 | 10/1996 | Sato et al. | 345/177 |

FOREIGN PATENT DOCUMENTS

| | | | |
|---|---|---|---|
| 333219A2 | 9/1989 | European Pat. Off. | G06K 11/06 |
| 526879A1 | 2/1993 | European Pat. Off. | G06K 11/14 |
| 3425811A1 | 3/1985 | Germany | G01B 17/02 |

*Primary Examiner*—James P. Trammell
*Assistant Examiner*—Demetra R. Smith
*Attorney, Agent, or Firm*—Fitzpatrick, Cella, Harper & Scinto

[57] ABSTRACT

Disclosed is a coordinate input device, having a vibration transmission plate, that simplifies the measurement of a vibration transmission speed, which is used as a known constant to calculate a distance between a vibration input location and individual vibration sensors, and that ensures the accurate performance of calculations to acquire input coordinates. According to the present invention, a vibration transmission plate has anisotropic properties that are associated with two axes. As a result, the speeds at which vibrations arrive at vibration sensors differ depending on which pair of vibration sensors, 6a and 6d, or tb and 6c, is involved. Therefore, the vibration transmission speeds are measured for the individual pairs of vibration sensors, 6a and 6d, and 6b and 6c, and the measured values are stored as known values. These values are employed as constants to be used for calculations performed to acquire coordinates.

15 Claims, 18 Drawing Sheets

COORDINATE INPUT DEVICE AND A CONTROL METHOD THEREFOR

BACKGROUND OF THE INVENTION

1. Field of the Invention

The present invention relates to a coordinate input device that detects the coordinates of a designated point by using transmission periods for vibrations carried across a vibration transmission plate, and to a control method therefor.

2. Related Background Art

A known, conventional coordinate input device that is used for obtaining the coordinates of an input point, employs vibrations, which are produced using a vibrator pen incorporating a piezoelectric device, that are carried across a vibration transmission plate and that are detected by a plurality of vibration sensors mounted on the vibration transmission plate.

Generally, the coordinate input device acquires in advance a transmission speed for a vibration wave that is carried across the vibration transmission plate, and retains the acquired transmission speed as a speed constant. Later, the coordinate input device employs the speed constant to multiply times for vibration transmission from the vibrator pen to the individual sensors. Distances between the vibrator pen and the individual vibration sensors are thus obtained, and are employed to calculate the input coordinates.

Especially when employing a plate wave as a vibration wave that is transmitted across the vibration transmission plate, attention was given to the fact that the transmission speed of the plate wave depends on the thickness and the frequency of the plate, and a method is employed for calculating a transmission speed by referring to the frequency of the detected vibration and the thickness of the plate that is measured, instead of obtaining the transmission time directly by actual measurement.

Specifically, based on the fact that a phase velocity is obtained as a function of the frequency and the plate thickness, and a group velocity is obtained as a function of only the plate thickness, to set a sonic velocity (transmission speed) for a plate wave, a method has been proposed whereby a frequency is first measured by phase synchronism of a vibration detected signal, the phase velocity is measured from the frequency and the plate thickness, and the group velocity being acquired using the pressure imposed on the plate. This method has been provided in order to improve the accuracy for the detection of locations, and to enhance reliability and enable mass production.

For the conventional coordinate input device, in one case the transmission speeds calculated for the readings obtained by the individual vibration sensors are employed as constants for coordinate calculation; in a second case the average value of the transmission speeds, or the transmission speed calculated for the reading obtained by a specific vibration sensor, is employed as a speed constant for coordinate calculation. The following problems, however, have arisen.

In the first case, wherein the transmission speeds are calculated for the readings of individual vibration sensors and are employed as constants for coordinate calculation, a problem has arisen concerning the mass production associated with industrialization. In other words, since transmission speeds must be measured or calculated for all of the vibration sensors, the number of work procedures is increased, and the load applied to a calculation circuit while performing the calculation of coordinates is increased.

In the second case, wherein one constant is used in common by all of the vibration sensors, although no problem occurs so long as a uniform, homogenous medium is used as a vibration transmission plate, the accuracy of the detection of input coordinates is reduced when a vibration transmission plate is employed across which the transmission speed of the vibration varies in consonance with the direction of the vibration transmission, i.e., a transmission vibration plate having anisotropic properties.

When a vibration transmission plate made of metal, such as aluminum, is employed, anisotropy occurs because the grain boundaries of the metal are aligned in a specific direction during rolling mill processing, and the transmission conditions for vibrations thus vary in consonance with the direction in which the vibrations are transmitted. When a resin sheet is used as a transmission vibration plate, anisotropy also occurs in the direction in which the sheet is stretched during the manufacturing process. Anisotropy occurs not only when a resin sheet serves as a vibration transmission plate, but also when a vibration transmission plate is fabricated by attaching a resin sheet to another plate member.

The problem that occurs when a vibration transmission plate has anisotropic properties will be specifically explained. FIG. 16 is a specific diagram illustrating a vibration transmission plate having vibration sensors A and A', and B and B' of a conventional input coordinate device. The vibration transmission plate has anisotropic properties and transmission speeds differ in consonance with the direction in which vibrations are transmitted.

With a conventional input coordinate device, the distances between a vibrator pen and the individual vibration sensors are calculated by using the average for the vibration transmission times that are acquired by the individual vibration sensors, i.e., by using the same constant for each of the sensors, yielding an error that is defined as ΔL. Shown in FIG. 17 is the relationship between the error ΔL and the distances to the individual vibration sensors. In FIG. 17, the error ΔL is obtained for the individual vibration sensors when the vibrator pen is moved diagonally, in the directions indicated by arrows in FIG. 16, across the transmission vibration plate, and the horizontal axis represents the distance between the vibrator pen and each vibration sensor during these movements.

The example in FIG. 17 is related to a coordinate input device wherein the center 0 of the scan distance is employed as a reference point and the value for the error ΔL is adjusted and reduced to the minimum. Therefore, while the value for the error ΔL is the smallest at the center 0, it is the largest at the points where it is the nearest to and the farthest from a vibration sensor. The inclination directions for the errors ΔL relative to the vibration sensors A and A', and B and B' are divided into two pairs: the senors A and A', and the sensors B and B'. The inclinations of the errors ΔL between the two pairs are almost the inverse of each other.

This is because one vibration transmission speed (average value) is employed to calculate the distances to all the vibration sensors, even though, due to the above described anisotropic properties of the vibration transmission plate, the vibration transmission speeds differ in the two directions indicated by the arrows in FIG. 16, and the relationship between the distance and the vibration transmission time differs for the two directions.

Shown in FIG. 18 is the relationship, for a coordinate input device with a vibration transmission plate having no anisotropic properties, of an error ΔL, which was obtained under the same conditions as in the example in FIG. 17, and the distances to the individual vibration sensors. As is shown in FIG. 18, it is understood that, when a vibration transmission plate having no anisotropic properties is employed, the above described problem does not occur, even when a single vibration transmission speed (average value) is used to calculate the distances to all of the vibration sensors.

When one fixed constant is used relative to all of the vibration sensors for a vibration transmission plate having anisotropic properties and wherein the vibration transmission speed varies depending on the vibration transmission direction, such an arrangement can not cope with a situation where the vibration transmission speed is varied for one vibration sensor in consonance with the vibration transmission angle (incident angle). Thus, an error occurs in the calculation of the distance to the vibration sensor, and accuracy is reduced. More specifically, as is shown in FIG. 26, when coordinate points input by the vibrator pen in an effective area are different, accordingly, the vibration transmission path and the transmission direction for the vibration from the vibrator pen to the vibration sensor are changed. As the vibration transmission angle indicated by a in FIG. 26 is changed for a vibration transmission plate having anisotropic properties, the vibration transmission speed varies, and as is shown in FIG. 27, the error $\Delta L$ that occurs when measuring the distance between a vibration sensor and the vibrator pen is caused by a deviation that is the equivalent of the difference from the fixed constant.

SUMMARY OF THE INVENTION

It is, therefore, one object of the present invention to provide a coordinate input device, having a vibration transmission plate, that simplifies the measurement of a vibration transmission speed, which is used as a known constant to calculate a distance between a vibration input location and individual vibration sensors, and that ensures the accurate performance of calculations to acquire input coordinates.

To achieve the above object, according to one aspect of the present invention, a coordinate input device, which obtains a vibration input location based on times required for transmission of vibrations across a vibration transmission plate having anisotropic properties, comprises:

transmission time measurement means, including a first pair of vibration sensors and a second pair of vibration sensors located opposite each other on the vibration transmission plate, for measuring times required for transmission of vibrations from the vibration input location to each of the vibration sensors;

transmission speed storing means for storing a first vibration transmission speed and a second vibration transmission speed at which the vibrations are transmitted across the vibration transmission plate;

distance calculation means for calculating distances between the vibration input location and the locations of each of the first pair of vibration sensors, by employing the time required for vibration transmission, which is obtained for each of the first vibration sensors, and the first vibration transmission speed, and for calculating distances between the vibration input location and the locations of each of the second pair of vibration sensors, by employing the time for vibration transmission, which is obtained for each of the second vibration sensors, and the second vibration transmission speed; and coordinate calculation means for calculating the vibration input location from the distances that are acquired.

DETAILED DESCRIPTION OF THE PREFERRED EMBODIMENTS

The preferred embodiments of the present invention will now be described while referring to the accompanying drawings.

[First Embodiment]

Figure 1:
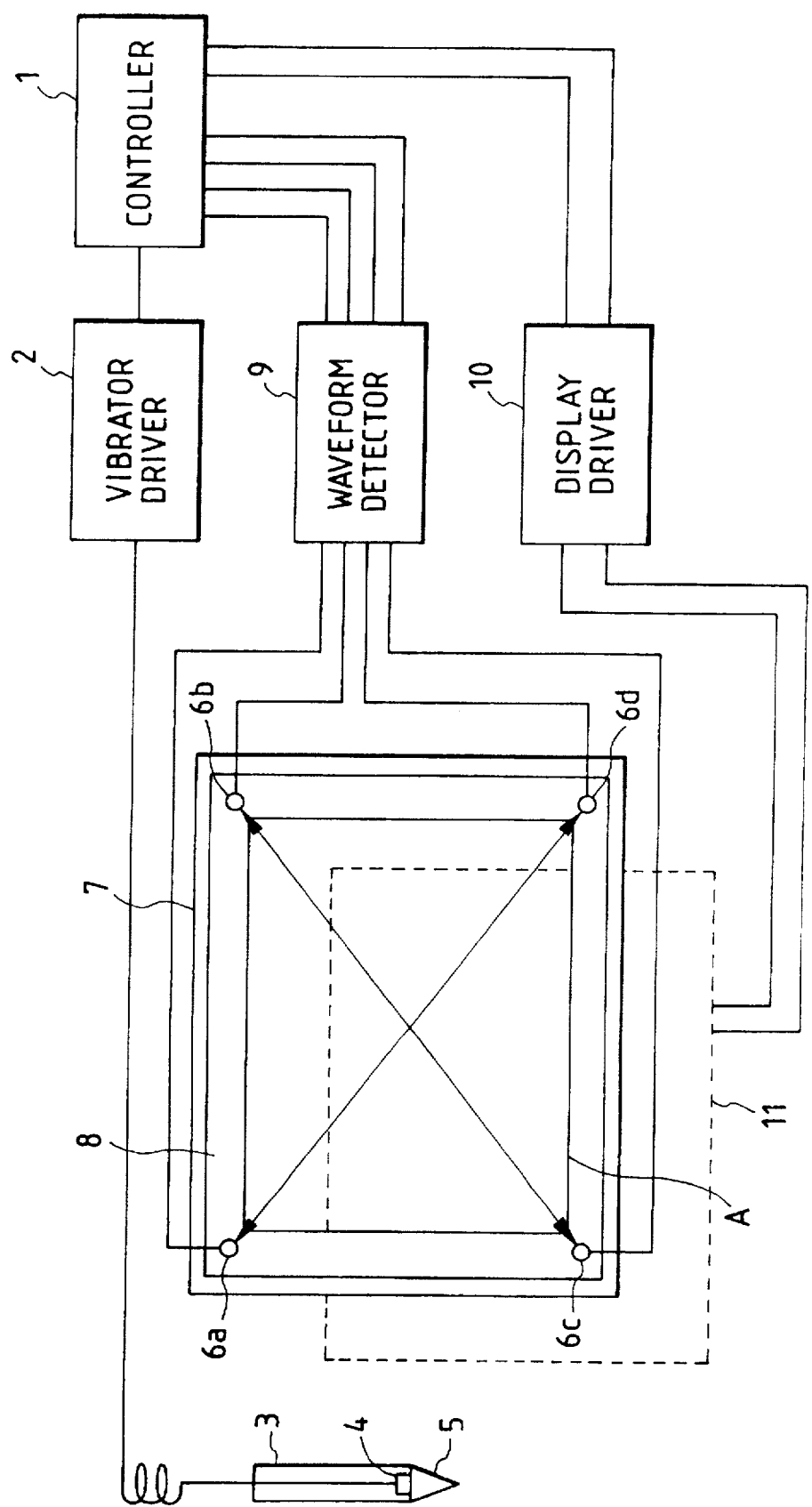
FIG. 1 is a schematic diagram illustrating the arrangement of a coordinate input device according to a first embodiment of the present invention.

FIG. 1 is a schematic diagram illustrating the arrangement of a coordinate input device according to a first embodiment of the present invention. A controller 1 controls the entire device and calculates input coordinates. A vibrator driver 2 supplies a drive signal to a vibrator 4 of a vibrator pen 3 to vibrate a pen tip 5. A vibration transmission plate 8 is made of a transparent member, such as an acrylic or a glass plate, that the vibrator pen 3 contacts when inputting coordinates. Actually, when inputting a vibration, the vibrator pen 3 contacts a desired location in an effective area A of the vibration transmission plate 8.

A vibration protection member 7 encloses the external areas of the vibration transmission plate 8 to suppress reflected vibrations and prevent them from returning to the center portion. At the periphery of the vibration transmission plate 8, four vibration sensors 6a through 6d, such as piezoelectric devices, are securely positioned at the corners to convert mechanical vibrations into electric signals. Hereinafter, when the vibration sensors 6a through 6d are referred to, they are collectively described as the vibration sensors 6.

Signals output by the respective vibration sensors 6 are transmitted to pre-amplifiers (not shown) that are located in the vicinities of the vibration sensors 6, and signals obtained by amplification at a predetermined gain are sent to a waveform detector 9. Vibration detection signals that are generated by the waveform detector 9 for the vibration sensors 6 are transmitted to the controller 1. The controller 1 drives the vibrator 4 via the vibrator driver 2 at a predetermined cycle, and measures the elapsed time between the driving of the vibrator 4 and the receipt of a detection signal from the waveform detector 9, i.e., the vibration transmission time. The controller 1 then acquires the distances from the location where the vibrator pen 3 contacts the vibration transmission plate 8 to the individual vibration sensors 6, and employs the distances to calculate input coordinates.

A display 11, which can be a liquid crystal display, a CRT, or a projected display, is located behind the vibration transmission plate 8 so as to enable a display using dot units. The display 11, which is driven by a display driver 10, displays the location at which drawing is performed with the vibration pen 3. A user can see this display through the vibration transmission plate 8, made of a transparent material.

The vibrator 4 that is incorporated in the vibrator pen 3 is driven by the vibrator driver 2. A drive signal for the vibrator 4 is generated by the vibrator driver 2 by amplifying, at a predetermined gain, a low-level pulse signal that is received from the controller 1. The electric drive signal is converted into a supersonic mechanical vibration by the vibrator 4, and the mechanical vibration is transmitted to the vibration transmission plate 8 via the pen tip 5.

As a vibration frequency for the vibrator 4, a value is selected that will enable the generation of a plate wave on the vibration transmission plate 8 made of glass, etc. Further, a mode for vibrating the vibrator 4 perpendicular to the vibration transmission plate 8 is selected. When a resonance frequency for the vibration transmission member, including the pen tip 5, is used as the vibration frequency for the vibrator 4, an efficient vibration conversion is possible.

As is described above, an elastic wave that is transmitted across the vibration transmission plate 8 is a plate wave, and contrary to a surface wave, a plate wave is seldom affected by scratches or obstacles on the surface of the vibration transmission plate 8.

<Example arrangement of controller>

The controller 1 outputs, at a predetermined interval (e.g., 5 ms), a drive signal via the vibrator driver 2 to drive the vibrator 4 of the vibrator pen 3, and also activates a counter 33 at the time of transmission of the drive signal, and the counter begins measuring time. The vibrations that are generated by the vibrator pen 3 are received by the vibration sensors 6 following a delay that is in consonance with the distance travelled.

The waveform detector 9 detects signals from the vibration sensors 6, produces detection signals indicating that vibrations have arrived at the vibration sensors 6, and transmits the signal to the controller 1. The controller 1 fetches detection signals emitted by corresponding vibration sensors 6, and uses the values held by the counter 33 that correspond to the vibration receipt times, which are indicated by the detection signals, to obtain the vibration transmission times for the individual vibration sensors 6. Based on the vibration transmission times, the controller 1 calculates the vibration transmission distances to the individual vibration sensors 6 and calculates the coordinates for the point at which vibrations were input by the vibrator pen 3.

In addition, the controller 1 drives the display driver 10, for example, to display the obtained input coordinates, or to output the coordinates to an external device via a serial or a parallel communication port (not shown).

Figure 3:
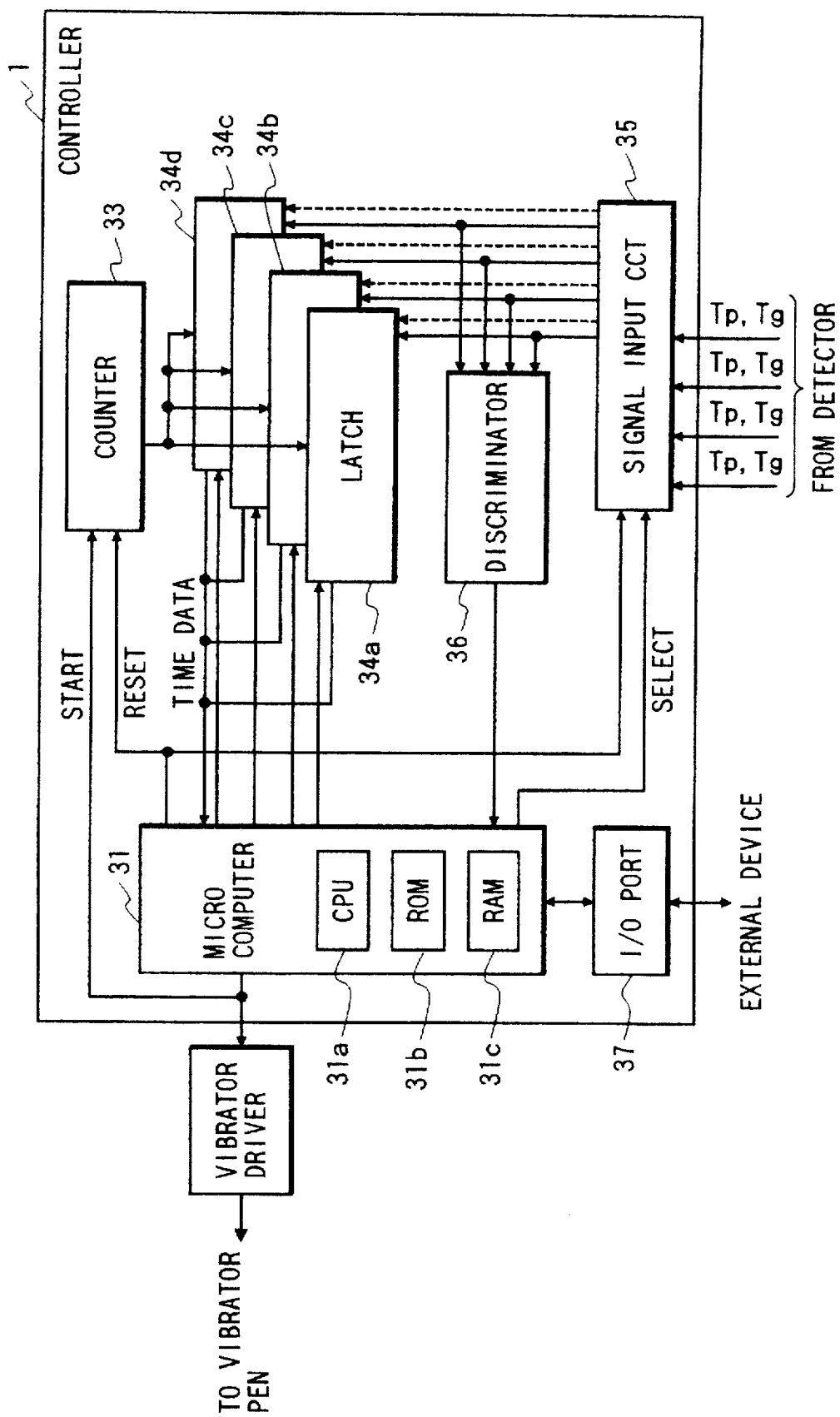
FIG. 3 is a block diagram illustrating the configuration of a controller.

FIG. 3 is a block diagram illustrating the arrangement of the controller 1. A microcomputer 31 provides operational control for the controller 1 (the entire coordinate input device). The microcomputer 31 includes a ROM 31b in which are stored operating procedures and various constants (including vibration transmission speed), a work memory RAM 31c that is to be employed for calculation, and a CPU 31a for performing calculations and providing control for the use of these components.

The counter 33 measures time in consonance with a reference clock signal (not shown). Upon receipt of a drive signal (start signal) for driving the vibrator 4 that is transmitted via the vibrator driver 2, the counter 33 is activated and begins measuring time. After the counter 33 has measured the vibration transmission time for each of the vibration sensors 6, it is re-initialized by a reset signal. Therefore, the beginning of the time measurement is synchronized with the detection of the vibrations performed by the vibration sensors 6 (waveform detector 9), and the time delay between the generation of the vibrations and the detection of the vibrations by the vibration sensors 6, i.e., the vibration transmission time, can be measured.

The detection signals (timing signals), for the vibration sensors 6, that are supplied by the waveform detector 9 are transmitted to latch circuits 34a through 34d via a signal input circuit 35. There are two types of detection signals, a tp signal and a tg signal, both of which will be described later. These signals are switched in consonance with a select signal, and the phase delay time and the group delay time are measured for the individual signals.

The latch circuits 34a through 34d correspond to the vibration sensors 6a through 6d. Upon receipt of a detection signal from the corresponding vibration sensor 6, the latch circuit latches the time value held by the counter 33 at that time. When a discriminator 36 determines that the detection signals for all of the vibration sensors 6 have been received, it outputs a reception complete signal to that effect to the microcomputer 31. Upon receipt of the reception complete signal from the discriminator 36, the microcomputer 31 reads, from the latch circuits 34a through 34d, the periods required for the vibrations to arrive at the individual vibration sensors 6, and performs predetermined calculations to acquire the coordinates for the location of the vibrator pen 3 on the vibration transmission plate 8.

The obtained coordinates are output to the display driver 10 via an I/O port 37, and a dot, for example, can be displayed at a corresponding location (at the coordinates) on the display 11. The acquired coordinates can be transmitted to an external device via the I/O port 37 and an interface circuit (not shown).

Figure 14:
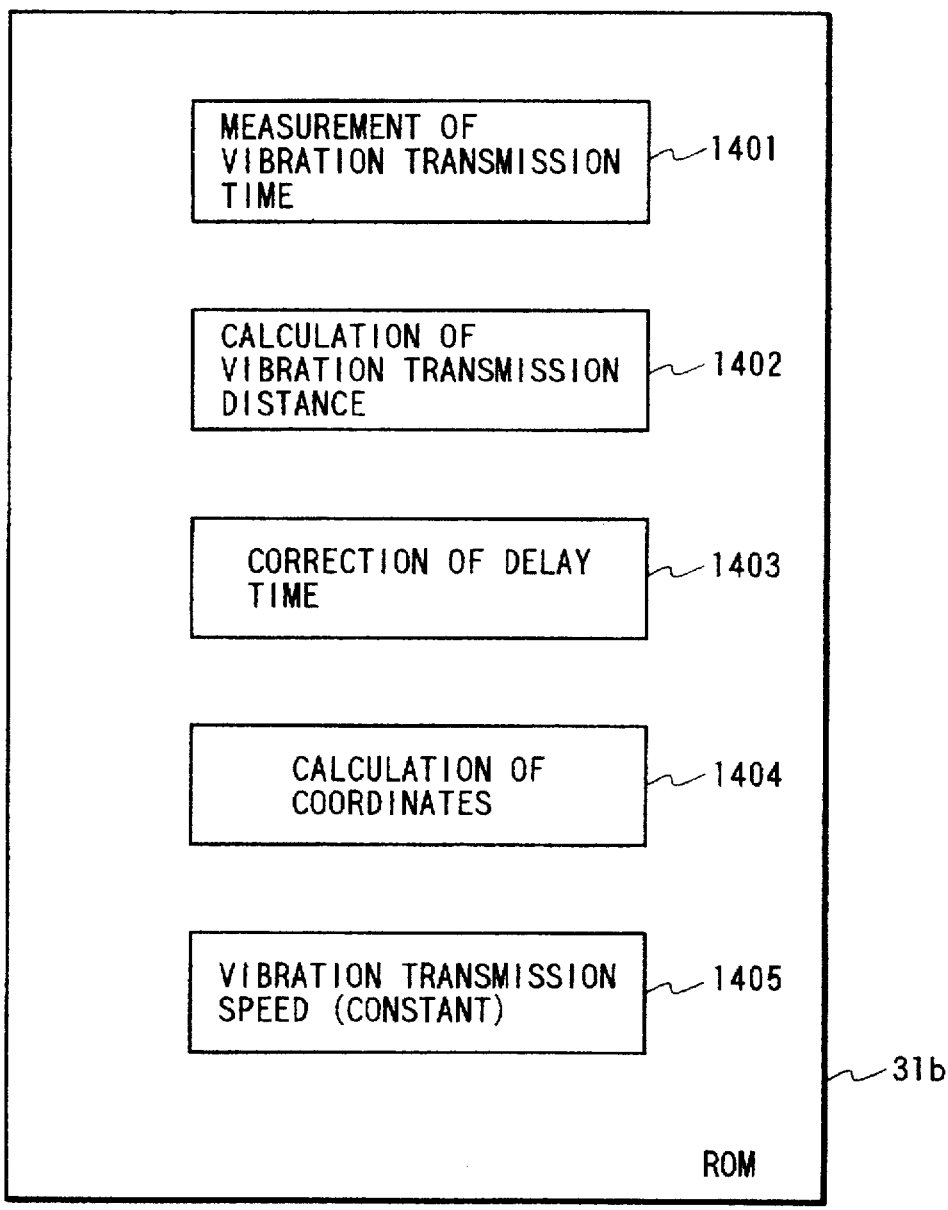
FIG. 14 is a conceptual diagram illustrating program code and a constant stored in a ROM of a microcomputer according to the first embodiment.

FIG. 14 is a conceptual diagram illustrating program code and a constant that are stored in the ROM 31b of the microcomputer 31. A program module 1401 is used to measure a time period between the driving, as previously described, of the vibrator pen 3 via the vibrator driver 2, and the detection of vibrations by the vibrator sensors 6, i.e., the vibration transmission time. A program module 1402 is used to calculate a distance from the vibrator pen 3 to each vibration sensor 6 using the obtained vibration transmission times and a vibration transmission speed that is stored as a constant in a program module 1405. A program module 1403 is used to correct the acquired distances. A program module 1404 calculates the vibration input coordinates using the obtained or corrected distances.

<Example calculation of vibration transmission distance>

Figure 4:
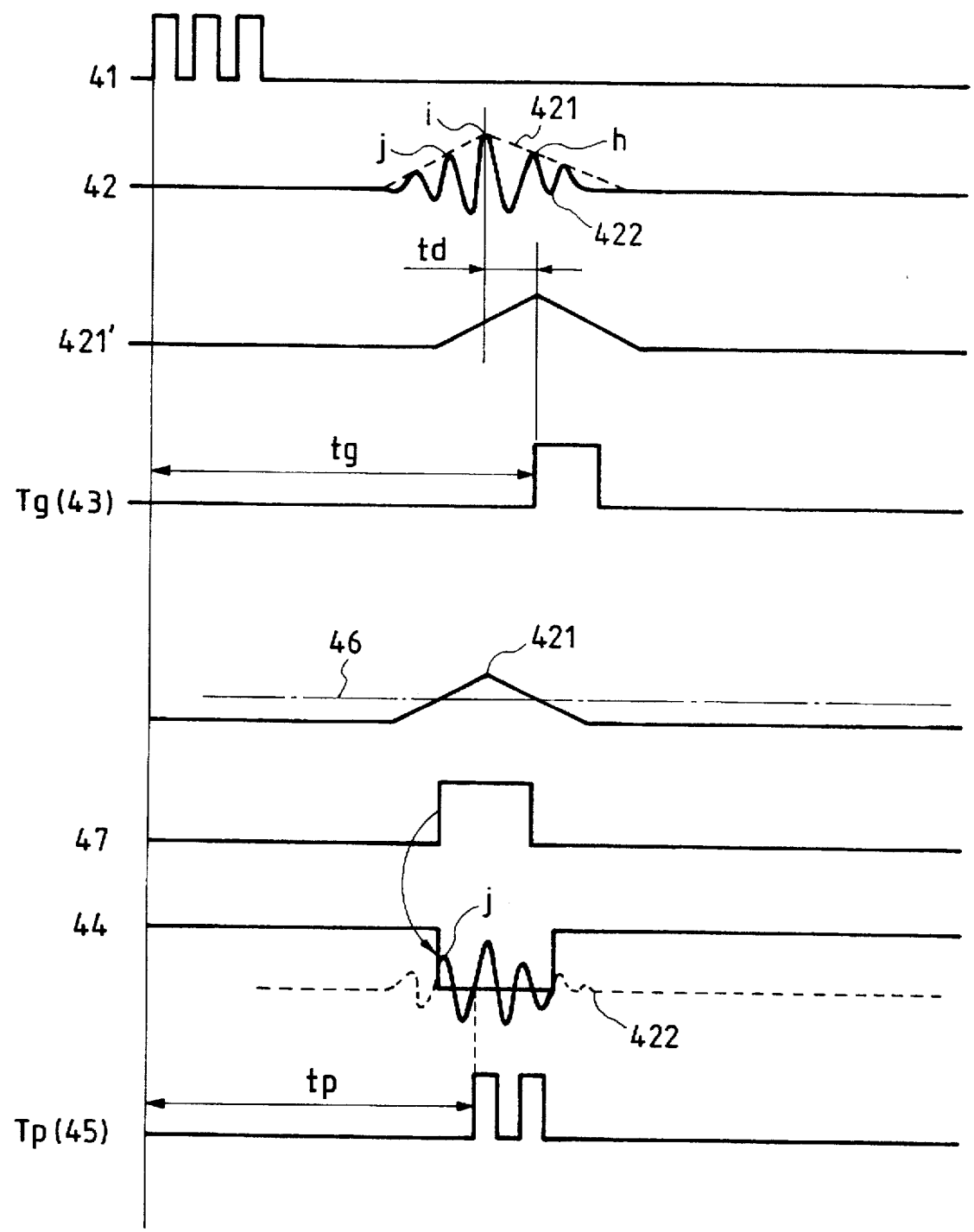
FIG. 4 is a chart showing signals input to a waveform detector, and is used to explain the principle employed for the measurement of the vibration transmission time based on these signals.

First, an explanation will be given for the principle for acquiring the distance for the transmission of vibrations from the vibrator pen 3 to each of the vibration sensors 6. The vibration transmission time is measured based on the function of the program module 1401, and the vibration transmission distance is calculated based on the function of the program module 1402. FIG. 4 is a chart for explaining the signals input to the waveform detector 9 and the principle of the process for measuring the vibration transmission times in consonance with the signals.

The measurement of the time for the transmission of vibrations from the vibrator pen 3 to the vibration sensors 6 is begun, as was previously described, at the same time a drive signal (start signal) 41 is output to the vibrator driver 2. The vibrator driver 2 then transmits the drive signal 41 to the vibrator 4, and in response to the drive signal 41, supersonic vibrations are generated by the vibrator pen 3 and transmitted to the vibration transmission plate 8. The vibrations advance for a period tg that corresponds to the distance to a vibration sensor 6, which thereafter detects the vibrations. A signal 42 in FIG. 4 describes an example waveform that is detected by the vibration sensor 6.

Since a plate wave is employed in this embodiment, the relationship between an envelope 421 of a detected waveform and its phase 422 varies depending on the vibration transmission distance traversed across the vibration transmission plate 8. Assuming that the speed at which the envelope 421 advances, i.e., the group velocity, is defined as Vg, and the speed at which the phase advances, i.e., the phase velocity, is defined as Vp, an explanation will now be given for the principle for determining the distance between the vibrator pen 3 and the vibration sensor 6 using the group velocity Vg and the phase velocity Vp.

First, for the envelope 421, when a specific point on a waveform, e.g., an inflection point or a peak point (see signal 42 or 43), is detected, distance d between the vibrator pen 3 and the vibration sensor 6 is acquired by expression (1):

$$d = Vg \cdot tg \quad (1)$$

wherein Vg denotes the velocity of the envelope 421 and tg denotes the vibration transmission time (group delay time).

Further, processing in accordance with the detection of a phase signal is performed in order to determine coordinates more accurately. Suppose that the time (phase delay time) to reach a specific detected point on the phase signal 422, i.e., for example, a zero-cross point, where a predetermined signal level 46 has been exceeded following the input of the vibrations, is tp (a signal 45 is generated by comparing the phase signal 422 with a window signal 44 having a specified width that is generated relative to a signal 47, and tp is obtained from the signal 45). The distance d between the vibrator pen 3 and the vibration sensor 6 is represented by expression (2):

$$d = n \cdot \lambda p + Vp \cdot tp \quad (2)$$

wherein λp denotes the wavelength of an elastic wave, and n is an integer.

From expressions (1) and (2), the integer n is represented by expression (3):

$$n = [(Vg \cdot tg - tp)/\lambda p + 1/N] \quad (3)$$

wherein N is any real number, other than 0, having an adequate value. With N=2 and with the vibration transmission time tg having a wavelength of ±1/2, for example, n can be determined. By substituting n into expression (2), the distance between the vibrator pen 3 and the vibration sensor 6 can be accurately measured.

A detection signal Tg, indicating the group delay time tg, and a detection signal Tp, indicating the phase delay time tp, are generated by the waveform detector 9 and are transmitted to the controller 1.

Figure 5:
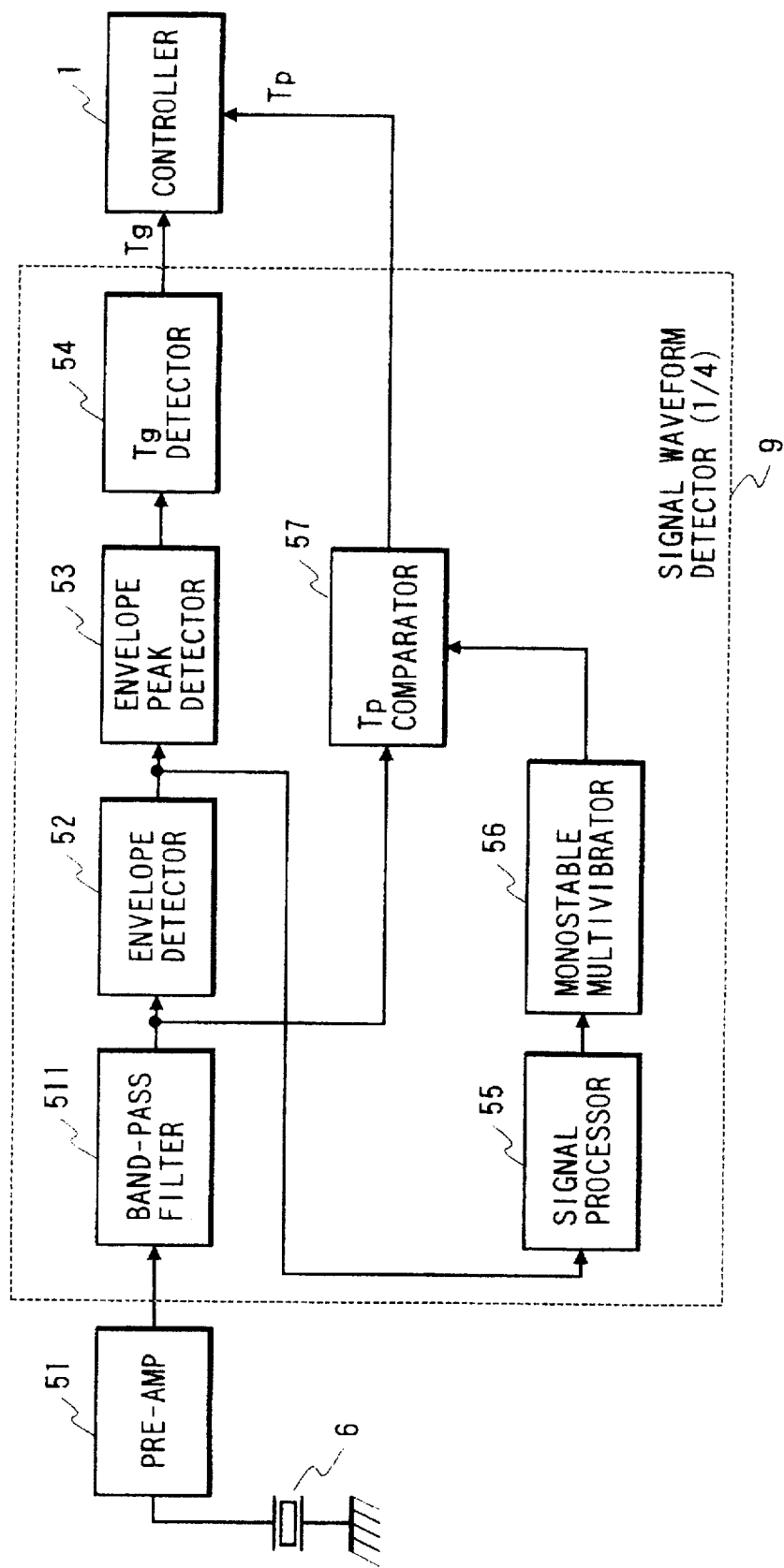
FIG. 5 is a block diagram illustrating the configuration of one part of the signal waveform detector.

FIG. 5 is a block diagram illustrating the structure of one part of the waveform detector 9. The configuration in FIG. 5 corresponds to one of the vibration sensors 6, and in actuality, four of these configurations are included in correspondence with the vibration sensors 6.

In FIG. 5, a signal output by the vibration sensor 6 is amplified at a predetermined gain by a pre-amplifier 51, which is located in its vicinity. Extra frequency components of the signal that are obtained by amplification are removed by a band-pass filter 511. The resultant signal (signal 42 in FIG. 4) is then transmitted to an envelope detector 52 that is constituted by, for example, an absolute value circuit and a low-pass filter, and only an envelope (the signal 421) is extracted. The timing for the peak of the envelope is detected by an envelope peak detector 53, and the detected timing for the envelope peak is transmitted to a Tg signal detector 54 that is constituted by a monostable multivibrator, etc. A detection signal Tg, which indicates that the envelope delay time has been detected, is generated by the Tg signal detector 54 and is transmitted to the controller 1.

A signal detector 55 forms a pulse signal 47 for the portion in FIG. 4 that exceeds a threshold signal 45 at a predetermined level in the envelope (the signal 421 in FIG. 4), which has been detected by the envelope detector 52. A monostable multivibrator 56 opens a gate signal (the signal 44) having a specified width that has been triggered by the first leading edge of the pulse signal. A Tp comparator 57 supplies to the controller 1, as the detection signal Tp, a zero-cross point for the phase signal (the signal 422) during the time that the gate signal is opened. In this example, the time that elapses before the zero-cross point is reached by the first leading edge of the phase signal is defined as the phase delay time tp.

The controller 1 acquires the vibration transmission time for each vibration sensor 6 from the detection signals Tg and Tp for the vibration sensor 6, and calculates the distances to the vibration sensors 6.

<Example for the correction of circuit delay time>

A latch count (vibration transmission time) that is latched by each of the latch circuits 34a through 34d in the controller 1 includes a circuit delay time et and a phase offset time toff. An error caused by these times is included in the vibrations when they are transmitted from the vibrator pen 3 across the vibration transmission plate 8 and are received by the vibration sensors 6.

Figure 6:
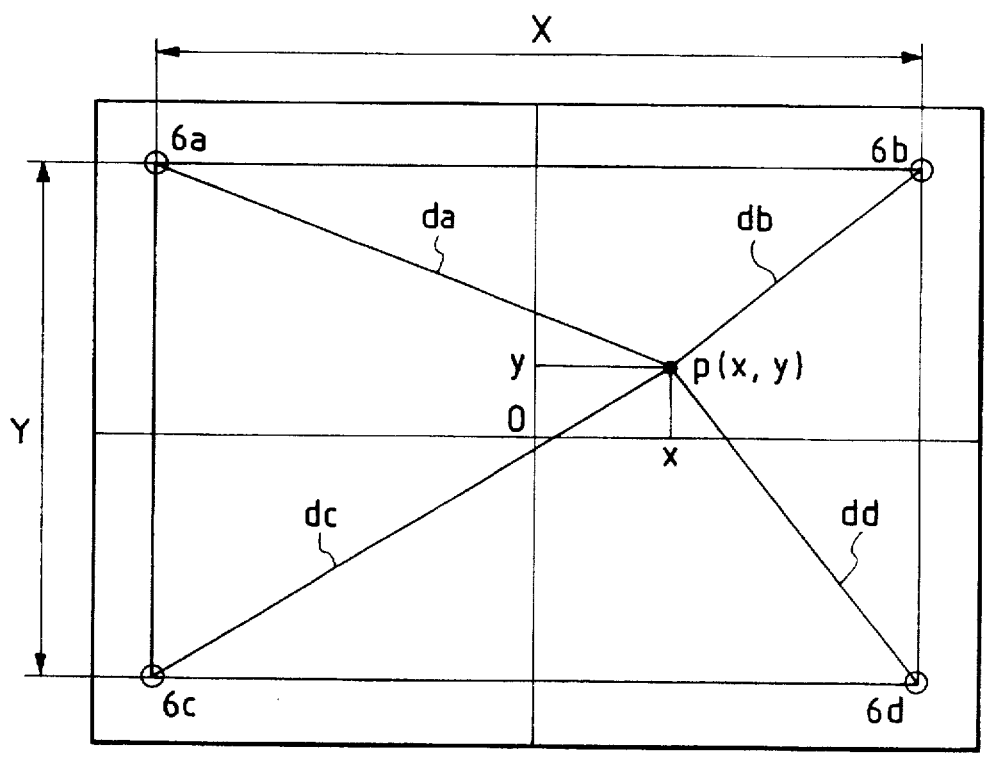
FIG. 6 is a plan view of the vibration transmission plate.

FIG. 6 is a plan view of the vibration transmission plate 8. In FIG. 6, vibration is input by the vibrator pen 3 at the origin O. The actual measured times (the group delay time and the phase delay time) for vibration transmission from the origin 0 to the vibration sensor 6a are defined as tgz' and tpz', and the true times for vibration transmission from the origin O to the vibration sensor 6a are defined as tgz and tpz. Expressions (4) and (5) are established for the circuit delay time et and the phase offset time toff:

$$tgz' = tgz + et \quad (4)$$

$$tpz' = tpz + et + toff \quad (5).$$

On the other hand, expressions (6) and (7) are established for the actual measurement values tg' and tp' at an arbitrary input point P:

$$tg' = tg + et \quad (6)$$

$$tp' = tp + et + toff \quad (7).$$

When differences between expressions (4) and (6) and between expressions (5) and (7) are calculated, the relationships represented by expressions (8) and (9) are established:

$$tg' - tgz' = (tg + et) - (tgz + et) = tg - tgz \quad (8)$$

$$tp' - tpz' = (tp + et + toff) - (tpz + et + toff) \quad (9)$$
$$= tp - tpz.$$

In other words, the circuit delay time et and the phase offset time toff included in each vibration transmission time are removed, and a true difference in the delay times for transmission from the location of the origin O to the input point P can be acquired in consonance with the distance, beginning at the position of the vibration sensor 6a. As a result, the difference between the distances can be calculated from expressions (2) and (3).

Since the distance from the vibration sensor 6a to the origin O is stored in advance in nonvolatile memory, etc., and thus is known, the distance between the vibrator pen 3 and the vibration sensor 6a can be determined. The distances to the other vibration sensors 6b through 6d can be acquired in the same manner.

The actual measured values tgz' and tpz' relative to the origin O are stored in nonvolatile memory at the time of shipping. Based on the program module 1403, calculations for expressions (8) and (9) are performed before the calculation of expressions (2) and (3) so as to provide an accurate measurement.

<Example for determining a constant concerning vibration transmission speed>

When a vibration transmission plate made of aluminum or another metal is employed, since the grain boundaries of the metal are aligned in a specific direction consonant with the direction in which the metal was rolled, the vibration transmission conditions vary depending on the vibration transmission direction, so that anisotropy occurs that causes the vibration transmission speed across the vibration transmission plate to be changed in consonance with the direction in which vibrations are transmitted. Anisotropy occurs not only in a metal plate, but also in a resin sheet, in consonance with the direction in which the sheet is stretched during the manufacturing process. And not only does anisotropy occur when a resin sheet serves as a vibration transmission plate, but also when a vibration transmission plate is fabricated by attaching a resin sheet to another plate member.

This embodiment is appropriate for a coordinate input device for which is employed a vibration transmission plate 8 having anisotropic properties, i.e., characteristically, the vibration transmission speed differs depending on the direction in which vibrations are transmitted. Currently available plate members are anisotropic more or less because of the above conditions encountered during the manufacturing process. Especially, in general production is a low anisotropic glass plate on which is laminated a highly anisotropic resin plate to prevent dispersion. One of the reasons this is done is that were a low anisotropic plate member to be used as a vibration transmission plate, special industrial materials would be required, and accordingly, manufacturing costs would be increased.

Figure 7:
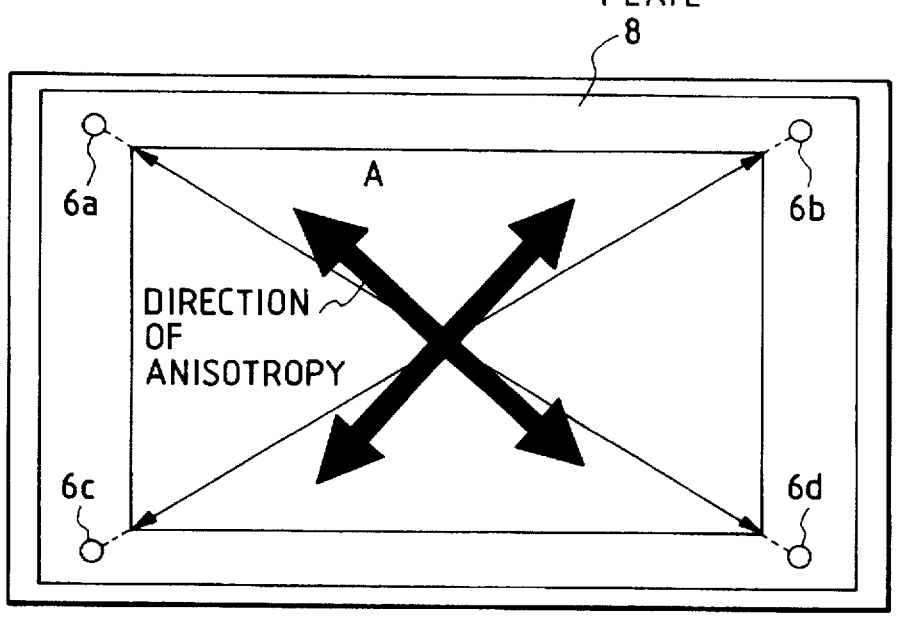
FIG. 7 is a conceptual diagram depicting the anisotropy of the vibration transmission plate according to the first embodiment.

FIG. 7 is a conceptual diagram depicting the anisotropy of the vibration transmission plate 8 in this embodiment. As is shown in FIG. 7, the vibration sensors 6a through 6d are located at the respective corners of the rectangular anisotropic vibration transmission plate 8. A rectangular effective area A is almost centered in a rectangle formed by the vibration sensors 6a through 6d located at the corners. The corners of the effective area A are so positioned that they are almost on the diagonal lines crossing the rectangle formed by the vibration sensors 6a through 6d. This positional relationship between the vibration sensors 6 and the effective area A is common for this type of coordinate input device.

As was previously described, in order to calculate the distances between the vibrator pen 3 and the individual vibration sensors 6, the vibration transmission times, i.e., the group delay time Vg and the phase delay time Vp, must be obtained in advance as constant values (stored, for example, in nonvolatile memory). Conventionally, as previously mentioned, an average value for the vibration transmission times measured for the vibration sensors 6 is acquired and stored to reduce manufacturing costs. In this embodiment, however, the vibration transmission speed is calculated for the two pairs of the vibration sensors 6 that are diagonally positioned, i.e., the pair of sensors 6a and 6d and the pair of sensors 6b and 6c, and is stored in the area 1405 in the ROM 31b.

For the measurement of the vibration transmission speed that is to be held as a constant value, for example, the distances and times for the transmission of vibrations from the vibrator pen 3 to the individual vibration sensors 6 may be measured by scanning using the vibrator pen 3 or by scanning across the vibration transmission plate 8 along the XY axis stage, and the actual measurement values for the distances and the times may be employed. Another method may also be employed to measure the vibration transmission speed.

As an example, take a case wherein the axial directions of the anisotropy of a vibration transmission plate 8 (hereinafter referred to simply as the direction of anisotropy) are the directions indicated by the heavy arrows in FIG. 7. It is easily understood that in accordance with the directions of the anisotropy concerning the vibration transmission speed, the difference between the vibration transmission speeds along the two intersecting axes is the maximum. In the example in FIG. 7, therefore, the arrows that indicate the directions of the anisotropy intersect each other. For a vibration transmission plate 8 having such anisotropic properties, the paired vibration sensors 6a and 6d, or 6b and 6c, that are diagonally positioned are symmetrical relative to the directions of the anisotropy. Therefore, the same vibration transmission speed can be satisfactorily used for the diagonally located vibration sensors 6. As a result, only one vibration transmission speed need be employed for each pair of diagonally located vibration sensors 6, and accordingly, only two vibration transmission speeds need be stored as constants in the ROM 31.

Figure 8:
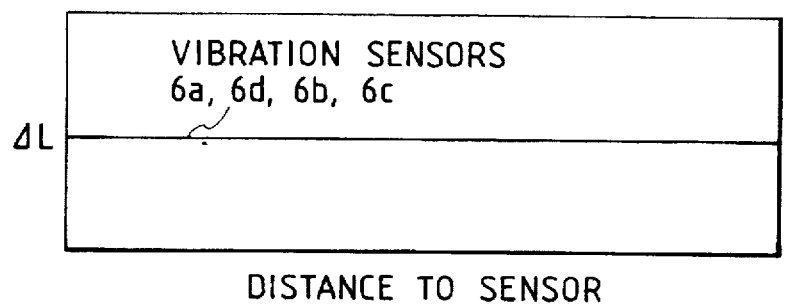
FIG. 8 is a diagram showing the relationship between a distance, from the vibrator pen to each of four vibration sensors along a diagonal line on a rectangular formed by the vibration sensors, that is calculated by using one vibration transmission speed for each pair of the diagonally facing vibration sensors, and a distance error $\Delta L$.

FIG. 8 is a diagram showing the relationship between the distances from the vibrator pen 3 to the vibration sensors 6, along the diagonal lines of a rectangle that is formed by the four vibration sensors 6, that are acquired by using one vibration transmission speed for each pair of the two diagonally positioned vibration sensor pairs, and the errors ΔL that occur when measuring the distances to the vibration sensors 6.

Figure 9:
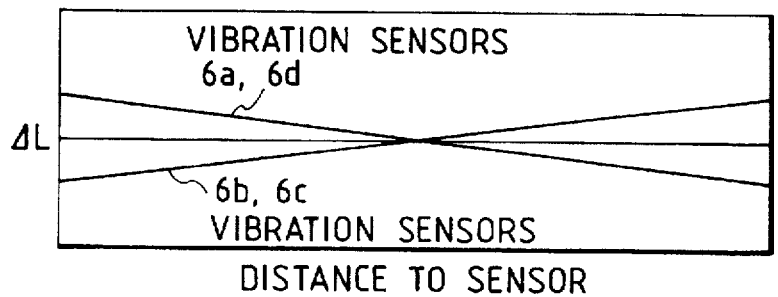
FIG. 9 is a diagram showing a conventional relationship between distances, from a vibrator pen to each of four vibration sensors, that are calculated under the same conditions as those shown in FIG. 8 while using an averaged vibration transmission time for the four vibration sensors, and a distance error $\Delta L$.

FIG. 9 is a diagram showing the conventional relationship between the distances from the vibrator pen to the individual vibration sensors, distances that are acquired by using an averaged vibration transmission time for the same vibration sensors under the same conditions as existed in the example shown in FIG. 8, and the errors ΔL that occur when measuring the distances to the vibration sensors.

It is apparent that the error ΔL in FIG. 8 in this embodiment is smaller than the error ΔL in FIG. 9 in the prior art. The same result as shown in FIG. 8 is obtained even when the vibration transmission speeds are stored as constants for the individual vibration sensors 6. However, since in this embodiment the measurement of the vibration transmission speed is required for only one pair of the diagonally located vibration sensors 6, industrially, this is far superior to the prior art, where the vibration transmission speed must be measured for each of the vibration sensors.

In addition, in accordance with the observation that during manufacture in the same production lot the anisotropy of the vibration transmission plates is consistent, and that the transmission speed for a plate wave depends on the thickness and the frequency of the plate, the relationship between the detected frequency and the measured thickness of the plate and the vibration transmission speed is acquired for each pair of the diagonally positioned vibration sensors 6. As for an individual vibration transmission plate, only the thickness of the plate need be measured to acquire the two kinds of vibration transmission speeds.

The measurement of the vibration transmission speeds is conducted along the diagonal lines crossing the rectangle that is formed by the four vibration sensors 6. The diagonal lines include the apexes of the effective area A, i.e., the points farthest from the vibration sensors 6. More specifically, since the vibration transmission speed is calculated based on the result provided by the measurement of the distance between the vibration sensor 6 and the vibrator pen 3 in the area wherein the maximum error can occur, the error that occurs relative to the acquired coordinates is small.

Although the examples shown in FIGS. 8 and 9 are the results obtained by measuring along the diagonal lines of the rectangle that is formed by the four vibration sensors 6, the method employed in this embodiment is also far better for measurements performed in an area other than that of the diagonal lines than is the conventional method that uses one constant. It should be noted that regardless of whether four constants are employed or two constants, as in this embodiment, an error will occur in an area other than that of the diagonal lines so long as the vibration transmission plate has anisotropic properties.

Figure 10:
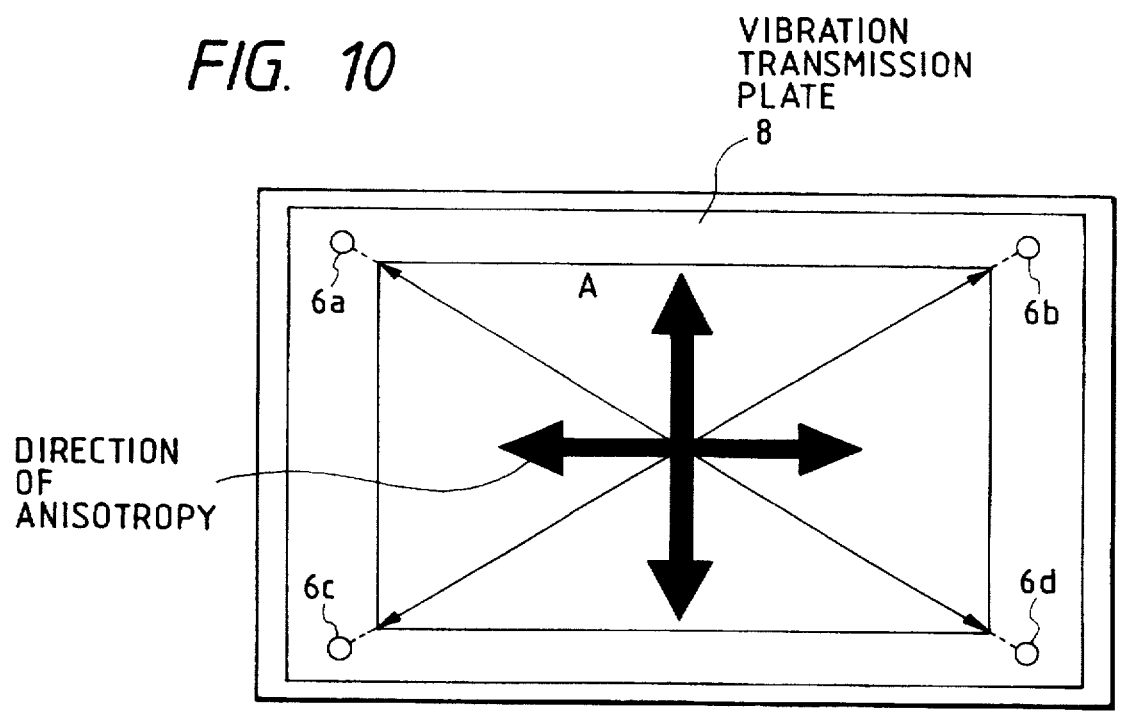
FIG. 10 is a diagram illustrating an example where the directions of the anisotropy are parallel to the sides of a rectangle formed by four vibration sensors.

An explanation will now be given for the determination of the vibration transmission distances that do not depend on the directions of the anisotropy of the vibration transmission plate. FIG. 10 is a diagram showing an example where the directions of anisotropy are parallel to the respective sides of the rectangle formed by four vibration sensors 6. This example has the same structure as the example shown in FIG. 7, except that the directions of the anisotropy of the vibration transmission plate 8 are different.

Figure 11:
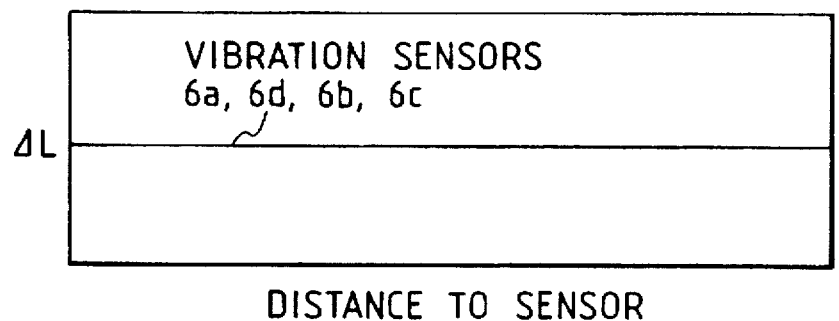
FIG. 11 is a diagram showing, for the arrangement shown in FIG. 10, the relationship between distances, from a vibrator pen to each of four vibration sensors along a diagonal line on a rectangular formed by the vibration sensors, that are calculated by using one vibration transmission speed for each pair of the diagonally facing vibration sensors, and a distance error $\Delta L$.

FIG. 11 is a diagram showing the relationship between the distances from the vibrator pen 3 to the vibration sensors 6, along the diagonal lines of the rectangle formed by the four vibration sensors 6, that are calculated by using one vibration transmission speed for each pair of the diagonally located vibration sensors 6, and the errors ΔL for the distances to the individual vibration sensors 6.

Figure 12:
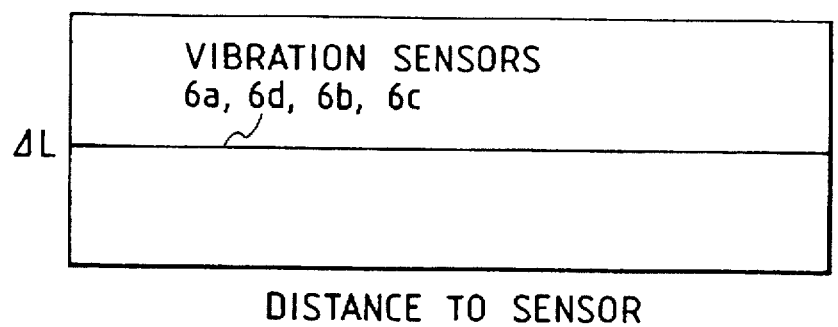
FIG. 12 is a diagram showing a conventional relationship between distances, from a vibrator pen to each of four vibration sensors, that are calculated under the same conditions as those shown in FIG. 11 while using an averaged vibration transmission time for the four vibration sensors, and a distance error $\Delta L$.

FIG. 12 is a diagram showing the conventional relationship between the distances from the vibrator pen 3 to the vibration sensors 6 that are calculated by using one averaged vibration transmission time for all of the four vibration sensors 6 and under the same conditions as those for the example in FIG. 11, and the errors ΔL for the distances to the vibration sensors 6.

In this prior art, as well as in the above example, the direction of the anisotropy of the vibration transmission plate 8 is applied as constituting the same condition for all the vibration sensors 6. Therefore, the error ΔL (see FIG. 11) in the distance obtained by using two transmission vibration speeds is small, as it is in the case where individual vibration transmission speeds (constants) are used for the vibration sensors 6.

The directions of the anisotropy are not limited to those shown in FIG. 7 or 10. More specifically, whatever the directions of anisotropy are, so long as the anisotropy that constitutes the difference between the vibration transmission speeds is the maximum in the intersecting direction, one vibration transmission speed can be used for each of the vibration sensor pairs 6. This is because, when the difference between the vibration transmission speeds is the maximum in the intersecting direction, the anisotropy acts uniformly on the vibration sensor pairs 6 that are diagonally positioned.

<Example for calculating coordinates>

An explanation will now be given, while referring to FIG. 6, for the principle of the calculation of the coordinates at which vibration is input by the vibrator pen 3 on the vibration transmission plate 8. The expression for calculating the coordinates is obtained by using the Pythagorean theorem.

In the arrangement shown in FIG. 6, distances da, db and dc from P (x, y), the position of the vibrator pen 3, to the vibration sensors 6a through 6c can be obtained by multiplying the vibration transmission times and the vibration transmission speeds that are stored in advance in the ROM 31, as was previously described, and by correcting for the results.

After the controller 1 has acquired the distances da, db and dc, based on these distances the controller 1 calculates the coordinates P (x, y) at which the vibrator pen 3 is in contact by using expressions (10) and (11):

$$x = X/2 + (da+db) \cdot (da-db)/2X \quad (10)$$

$$y = y/2 + (da+dc) \cdot (da-dc)/2Y \quad (11)$$

wherein X and Y respectively denote distances between the vibration sensors 6a and 6b and between the vibration sensors 6a and 6c. In this manner, the coordinates for the position of the vibrator pen 3 can be detected in real time. Although in this example the distances among the three vibration sensors 6a through 6c are employed to acquire coordinates, the distance to the vibration sensor 6d can be used to evaluate the appropriateness of the obtained coordinate or to enhance the accuracy of the calculation to obtain the coordinates.

In this embodiment, the vibration sensors 6 have been located at the respective corners of the vibration transmission plate 8. However, the vibration sensors 6 may be arranged, for example, in a cross shape, with each of them centered along one of the sides of the effective area A, or they may be otherwise arranged so long as a single vibration transmission time can be used as a constant for the diagonally positioned vibrator sensors 6.

[Second Embodiment]

In the first embodiment, in order to retain a single vibration transmission time as a constant for each pair of the diagonally located vibration sensors 6, scanning is performed for the vibrator pen 3 or the vibration transmission plate 8, and the distance and the time for vibration transmission from the vibrator pen 3 to the vibrator sensors 6 are measured. In a second embodiment, one of diagonally located vibration sensors 6 is driven and generates vibrations to measure the vibration transmission time, and based on the measured time, the vibration transmission speed (1405) is determined.

Figure 13:
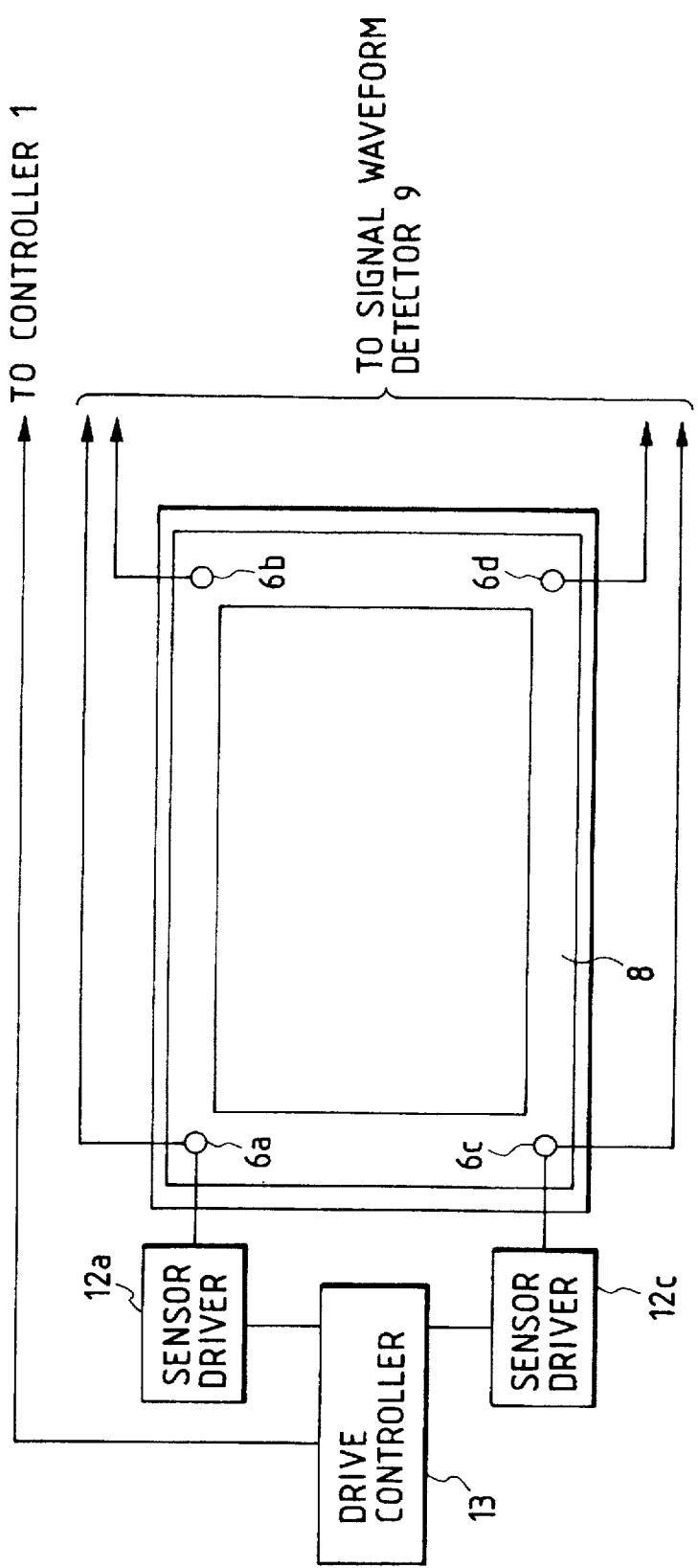
FIG. 13 is a block diagram illustrating the configuration of a coordinate input device according to a second embodiment of the present invention.

FIG. 13 is a block diagram illustrating an example configuration for a coordinate input device according to the second embodiment. In this embodiment, two vibration sensor drivers 12 and a drive controller 13 are additionally provided for the coordinate input device employed in the first embodiment; the other portions being the same as those in the first embodiment.

The two vibration sensor drivers 12a and 12c drive vibration sensors 6a and 6c, respectively, in the same manner as the vibrator driver 2 in the first embodiment drives the vibrator 4. The vibration sensors 6a and 6c, as well as the vibrator 4, serve as vibrators when drive signals are received from the respective vibration sensor drivers 12a and 12b. Whereas for the calculation of input coordinates, the vibration sensors 6a and 6c function as vibration sensors.

The drive controller 13, which drives the vibration sensors 6a and 6c individually, and selectively transmits a drive signal (start signal) received from the controller 1 to either the vibration sensor 6a or 6c.

In this embodiment, to measure the time required for the transmission of vibrations from the vibration sensor 6a to the vibration sensor 6d, the controller 1 drives the vibration sensor 6a, by using the vibration sensor driver 12a, in the same manner as the vibrator 4 is driven, so that the sensor 6a generates vibrations and the vibration sensor 6d detects the vibrations. To measure the time for the transmission of vibrations from the vibration sensor 6c to the vibration sensor 6b, the controller 1 drives the vibration sensor 6c, by using the vibration sensor driver 12c, in the manner as the vibrator 4 is driven, so that the vibration sensor 6c generates vibrations and the vibration sensor 6b detects them.

FIG. 14 is a conceptual diagram showing program codes and constants that are stored in a ROM 31b in a microcomputer 31 in this embodiment. The same reference numerals as are used in the first embodiment are used to denote corresponding or identical components, and no explanation for them will be given. An area 1405, in the ROM 31b, in which at least is stored the vibration transmission speed, is an electrically erasable memory, such as a EEPROM.

Figure 15:
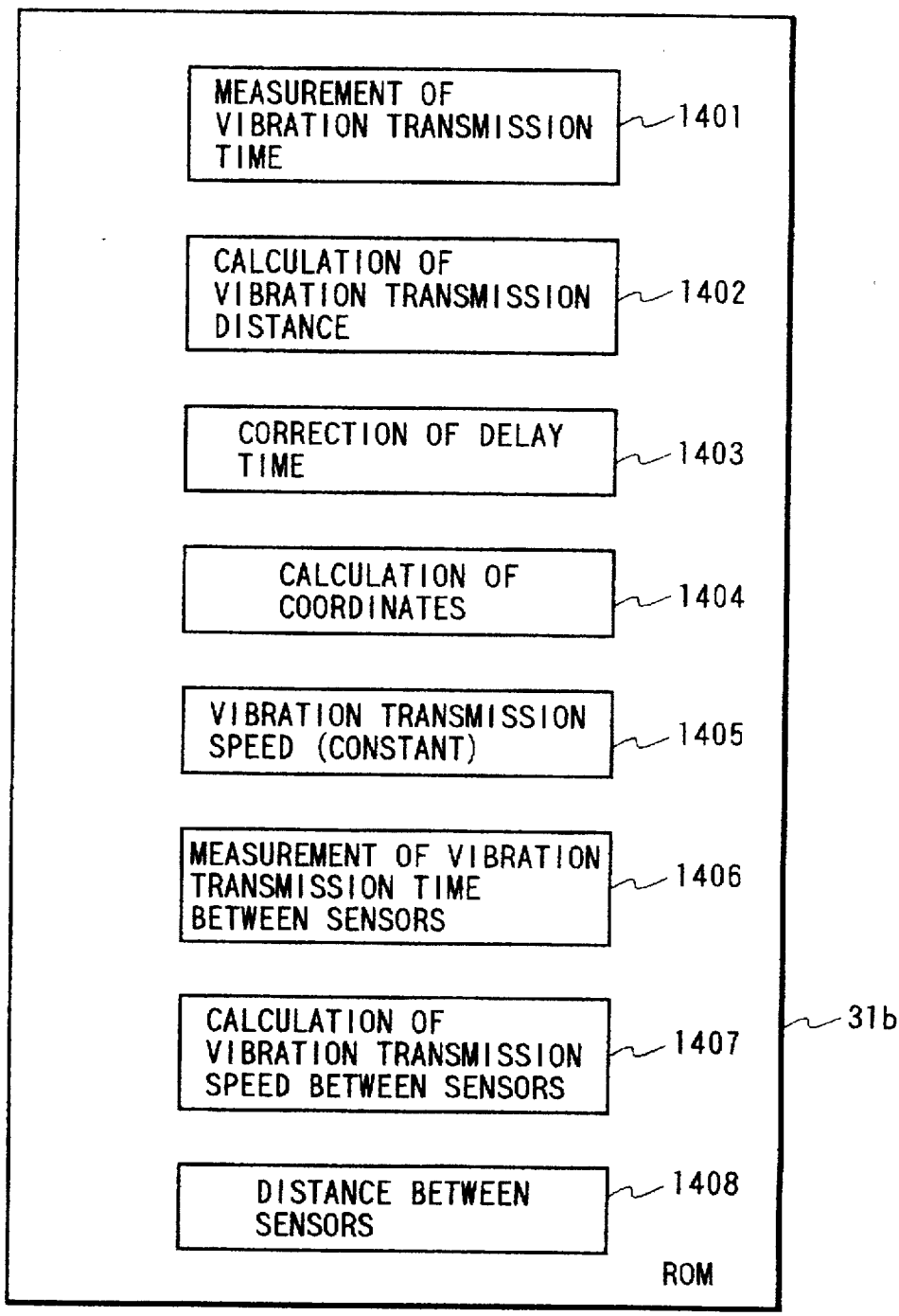
FIG. 15 is a conceptual diagram illustrating program code and a constant stored in the ROM of the microcomputer according to the first embodiment.
Figure 16:
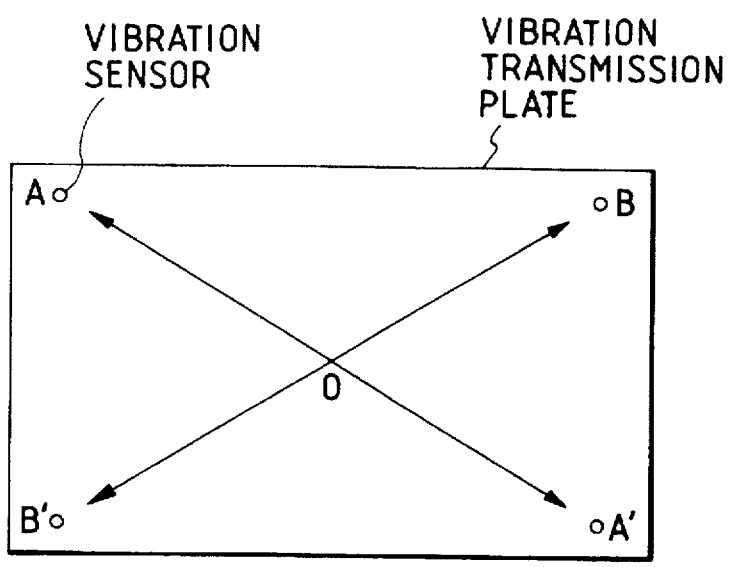
FIG. 16 is a specific diagram illustrating the typical arrangement of a vibration transmission plate and vibration sensors in a conventional coordinate input device.
Figure 17:
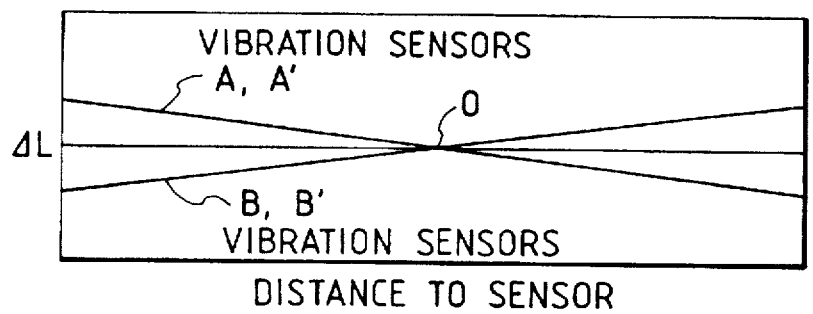
FIG. 17 is a diagram showing the relationship, for the conventional coordinate input device, of the distances between a vibrator pen and the individual vibration sensors that are calculated using an average for the vibration transmission times that are acquired by the individual sensors, and a distance error $\Delta L$.
Figure 18:
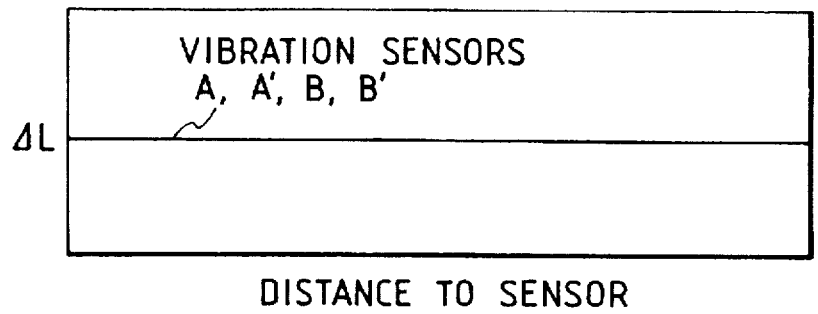
FIG. 18 is a diagram showing the relationship, for a coordinate input device with a vibration transmission plate having no anisotropic properties, of an error ΔL, which was obtained under the same conditions as in FIG. 17, and the distances to the individual vibration sensors.

In FIG. 15, a program module 1406 is employed to measure the vibration transmission time that elapses following the driving of one of the vibration sensors 6a and 6c, by the drive controller 13 and either the vibration sensor driver 12a or 12c, until the other vibration sensor 6, which is positioned diagonally opposite the driven vibration sensor 6, detects the vibration. A program module 1407 is employed to calculate the vibration transmission speeds between the vibration sensors 6a and 6d and between the vibration sensors 6c and 6b using the measured vibration transmission times for the sensors, and the sensor distances that are stored in a program module 1408.

As is described above, according to the embodiment, the coordinate input device does not require special measurement facilities to measure vibration transmission speeds that are set in advance, since constants are not required, and industrially, is far superior. Since the vibration transmission speed can be reset even after the product has been shipped, the vibration transmission speed can be adjusted (rewritten) in consonance with environmental changes or when parts are replaced. Therefore, continued high accurate coordinate detection can be provided.

The present invention can be applied to a system that is constituted by a plurality of devices, or to an apparatus that includes a single device. It is evident that the object of the present invention can be achieved by providing a storage medium, for a system or an apparatus, in which is stored software program code, for accomplishing the functions in the above embodiments, that a computer (a CPU or MPU) of the system or the apparatus can read and execute.

In this case, since the program code that has been read from the storage medium accomplishes the novel function provided by the present invention, the storage medium in which that program code is stored constitutes the present invention.

Such a storage medium for transmitting program code can be, for example, a floppy disk, a hard disk, an optical disk, a magneto-optical disk, a CD-ROM, a CD-R, a magnetic tape, a nonvolatile memory card, or a ROM.

Further, the functions of the above embodiments can be realized not only by executing the program code that has been read by the computer, but also, in accordance with an instruction contained in the program code, by the OS (Operating System) run by the computer performing a part, or all, of the actual processing.

In addition, the program code that is read from the storage medium can be written in an extension board inserted into the computer, or in the memory of an extension unit connected to the computer, and based on an instruction contained in the program code, a CPU mounted on the extension board or in the extension unit can execute a part, or all, of the actual processing. In this manner, the functions in the above embodiment can also be accomplished.

As is described above, according to the present invention, for a coordinate input device having a vibration transmission plate, it is easy to measure the vibration transmission speed that is used as a known constant when calculating the distance from a vibration input position to the individual vibration sensors 6, it is possible to constantly provide accurate calculations to obtain input coordinates.

[Third Embodiment]

Since the arrangement of a coordinate input device according to a third embodiment is almost the same as those for the first and the second embodiments, only a brief explanation for it will be given.

Figure 19:
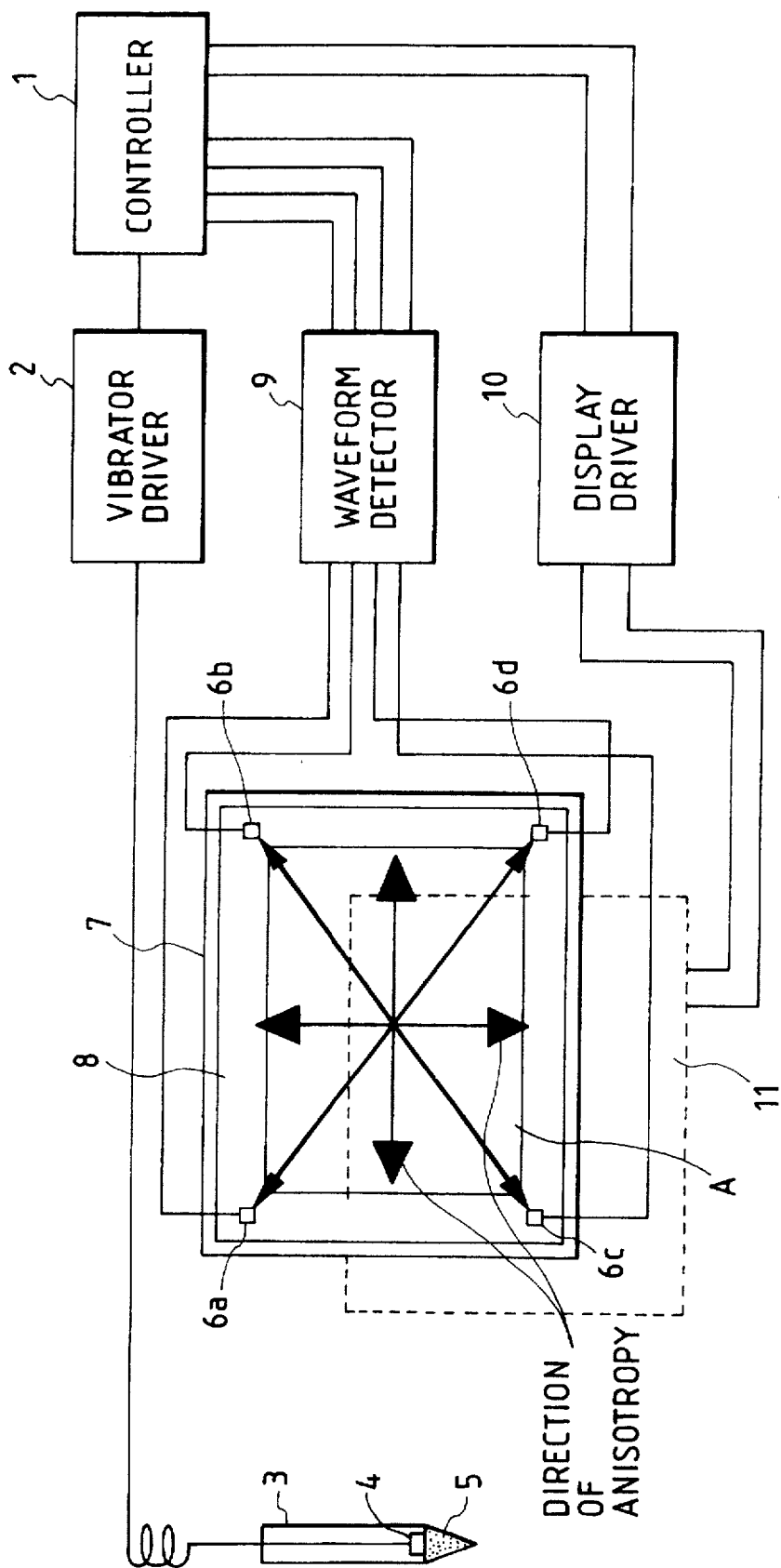
FIG. 19 is a diagram illustrating the configuration of a third embodiment of the present invention that most preferably represents the feature of the embodiment.

FIG. 19 is a diagram that most preferably represents the feature of the arrangement of the coordinate input device according to the third embodiment.

In FIG. 19, a controller 19 controls the entire device and calculates coordinate positions. A vibrator driver 2 vibrates a pen tip 5 of a vibrator pen 3. A vibration transmission plate 8 is made of a transparent member, such as an acrylic or a glass plate, and to input coordinates, the vibrator pen 3 contacts the surface of the vibration transmission plate 8.

An area A (hereinafter referred to as an effective area A) delineated by solid lines is provided for the vibration transmission plate 8. Only those coordinates that are designated in the effective area A by the vibrator pen 3 are regarded as effective input coordinates. This area A is shaped like a rectangle, and is determined by the specifications for the coordinate input device, such as the required coordinate input accuracy or the coordinate input range.

A vibration protection member 7 encloses the external areas of the vibration transmission plate 8 to suppress (reduce) reflected vibrations and prevent them from returning to the center portion. In the periphery of the vibration transmission plate 8, four vibration sensors 6a through 6d, such as piezoelectric devices, are securely positioned at the corners and outside the effective area for the conversion of mechanical vibrations into electric signals.

The vibration transmission plate 8 in this embodiment is anisotropic and vibration transmission speeds differ depending on the direction in which vibrations are transmitted. This anisotropic property is present in a metal plate that is manufactured using a metal rolling mill process, or is provided by attaching an anisotropic resin sheet to the vibration transmission plate 8. The directions of the anisotropy intersect each other. The direction of the anisotropy of the vibration transmission plate 8 is so adjusted that the two intersecting axes of the anisotropy are placed along the bisectors of the angles that are formed by two line segments that connect the respective diagonally opposite vibration sensors 6a and 6d, and 6b and 6c. In other words, a metal plate, for example, is cut and processed so that the directions of anisotropy are consonant with the directions of the bisectors. Or, a resin sheet is attached to a glass plate so as to align the directions of the bisectors and the directions of the anisotropy.

Signals output by the respective vibration sensors 6 are transmitted to pre-amplifiers (not shown), which are located in the vicinities of the vibration sensors 6, and signals obtained by amplification at a predetermined gain are sent to a waveform detector 9. Vibration detection signals that are generated by the waveform detector 9, relative to the vibration sensors 6, are transmitted to the controller 1 for the calculation of coordinates. During the calculation of the input coordinates, first, relative to the vibration transmission time that has been measured, a tentative distance from the vibrator pen 3 to the vibration sensor 6 is calculated by using a fixed constant. A vibration transmission angle extending from the vibrator pen 3 to the vibration sensor 6 is calculated from the obtained tentative input coordinates. The vibration transmission speed is introduced from the acquired vibration transmission angle. An exact distance, relative to the measured vibration transmission time, from the vibrator pen 3 to the vibration sensor 6 is again calculated by using the vibration transmission speed. In this manner, accurate input coordinate calculation is performed. A detailed explanation will be given later for the anisotropy of the vibration transmission plate 8 and the locations of the vibration sensors 6, the determination of constants for the vibration transmission speed, and the calculation of coordinates.

A display 11 is a liquid crystal display, a CRT, or a projected display, on which a display composed of dot units can be provided, and is located behind the vibration transmission plate 8, when it is transparent. The display 11 is driven by a display driver 10 to display the position at which the scanning is performed using the vibration pen 3. A user can observe this display through the vibration transmission plate 8 that is made of a transparent material.

Figure 2:
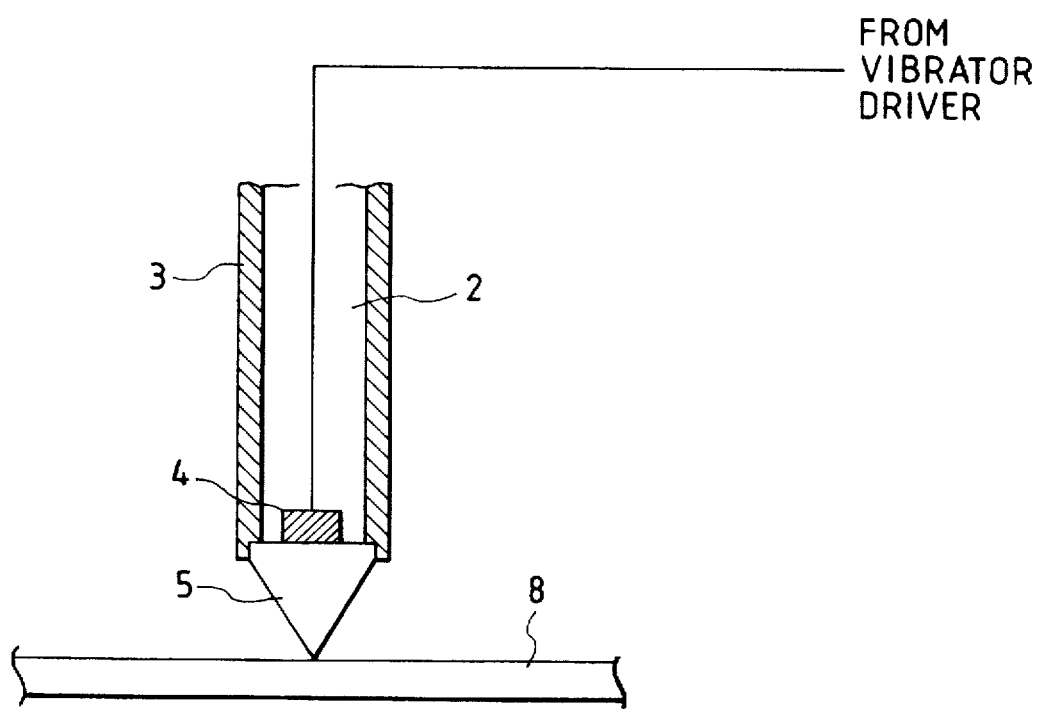
FIG. 2 is a diagram illustrating an example arrangement of a vibrator pen and a vibration transmission plate.

As is shown in FIG. 2, the vibrator 4 that is incorporated in the vibrator pen 3 is driven by the vibrator driver 2, which is also incorporated in the vibrator pen 3. A drive signal for the vibrator 4 is transmitted as a low level pulse signal by the controller 1, and is amplified by the vibrator driver 2 at a predetermined gain. The resultant signal is then transmitted to the vibrator 4.

The electric drive signal is converted into mechanical supersonic vibrations by the vibrator 4, and the mechanical vibrations are transmitted to the vibration transmission plate 8 via the pen tip 5.

A vibration frequency of the vibrator 4 is set to a value that will enable the generation of a plate wave on a vibration transmission plate 8 composed of glass, etc. Further, a mode for vibrating the vibrator 4 perpendicular to the vibration transmission plate 8 in FIG. 2 is selected. Since a resonance frequency for the vibration transmission member, including the pen tip 5, is used as the vibration frequency for the vibrator 4, efficient vibration conversion is possible.

As is described above, an elastic wave that is to be transmitted across the vibration transmission plate 8 is a plate wave, and contrary to a surface wave, a plate wave is seldom affected by scratches or obstacles on the surface of the vibration transmission plate.

<Example arrangement of controller>

The controller 1 outputs, at a predetermined interval (e.g., 5 ms), a drive signal via the vibrator driver 2 to drive the vibrator 4 of the vibrator pen 3, and also begins to measure time using an internal timer, which is constituted by a counter. The vibration that is generated by the vibrator pen 3 is transmitted to the vibration sensors 6a through 6d with a delay consistent with their distances from the vibrator pen 3.

The waveform detector 9 detects signals from the vibration sensors 6a through 6d. Then, in a waveform detection process that will be described later, the waveform detector 9 produces signals indicating the times that the vibrations arrived at the vibration sensors 6. The controller 1 receives signals corresponding to the vibration sensors 6a through 6d, and acquires the vibration transmission times for the individual vibration sensors 6a through 6d to calculate the coordinates for the vibrations input by the vibrator pen 3.

In addition, the controller 1 drives the display driver 10, based on the obtained positional information for the vibrator pen 3, to control the display 11, or to output the coordinates to an external device via a serial or a parallel communication port (not shown).

FIG. 3 is a block diagram illustrating the arrangement of the controller 1. The individual components and the outline of their operations will now be explained.

A microcomputer 31 controls the controller 1 and the entire coordinate input device. The microcomputer 31 includes a ROM 31b in which are stored operating procedures and various constants (including a vibration transmission speed), a work memory RAM 31c to be employed for calculation, and a CPU 31a for performing calculations and exercising control using these components.

A timer 33 that is constituted by, for example, a counter measures a reference clock (not shown). The timer 33 begins to measure the time when a start signal for driving the vibrator 4 is input to the vibrator driver 2. As a result, the beginning of the time measurement is synchronized with the detection of the vibrations performed by the vibration sensors 6, and the times that elapses before the vibration sensors 6 detect the vibrations can be measured.

The circuit s of the other components will be described in order.

The vibration arrival timing signals for the vibration sensors 6 that are supplied by the waveform detector 9 are transmitted to latch circuits 34a through 34d via a signal input circuit 35. The latch circuits 34a through 34d correspond to the vibration sensors 6a through 6d. Upon receipt of a timing signal from the corresponding vibration sensors 6, the latch circuit 34 latches the time value currently held by the timer 33. When a discriminator 36 determines that detection signals for all of the vibration sensors 6 have been received, it outputs a signal of that effect to the microcomputer 31.

At this time, a select signal is out put as a determination switch signal for the discriminator 36.

Upon receipt of the signal from the discriminator 36, the microcomputer 31 reads, from the latch circuits 34a through 34d, the periods required for the vibrations to arrive at the individual vibration sensors 6. The microcomputer 31 performs predetermined calculations to acquire the coordinates for the location of the vibrator pen 3 on the vibration transmission plate 8.

The obtained coordinate information is output to the display driver 10 via an I/O port 37, and a dot, for example, can be displayed at a corresponding position on the display 11. The acquired coordinates can also be transmitted via the I/O port 37 to an interface circuit (not shown), which outputs the coordinate value to an external device.

Figure 24:
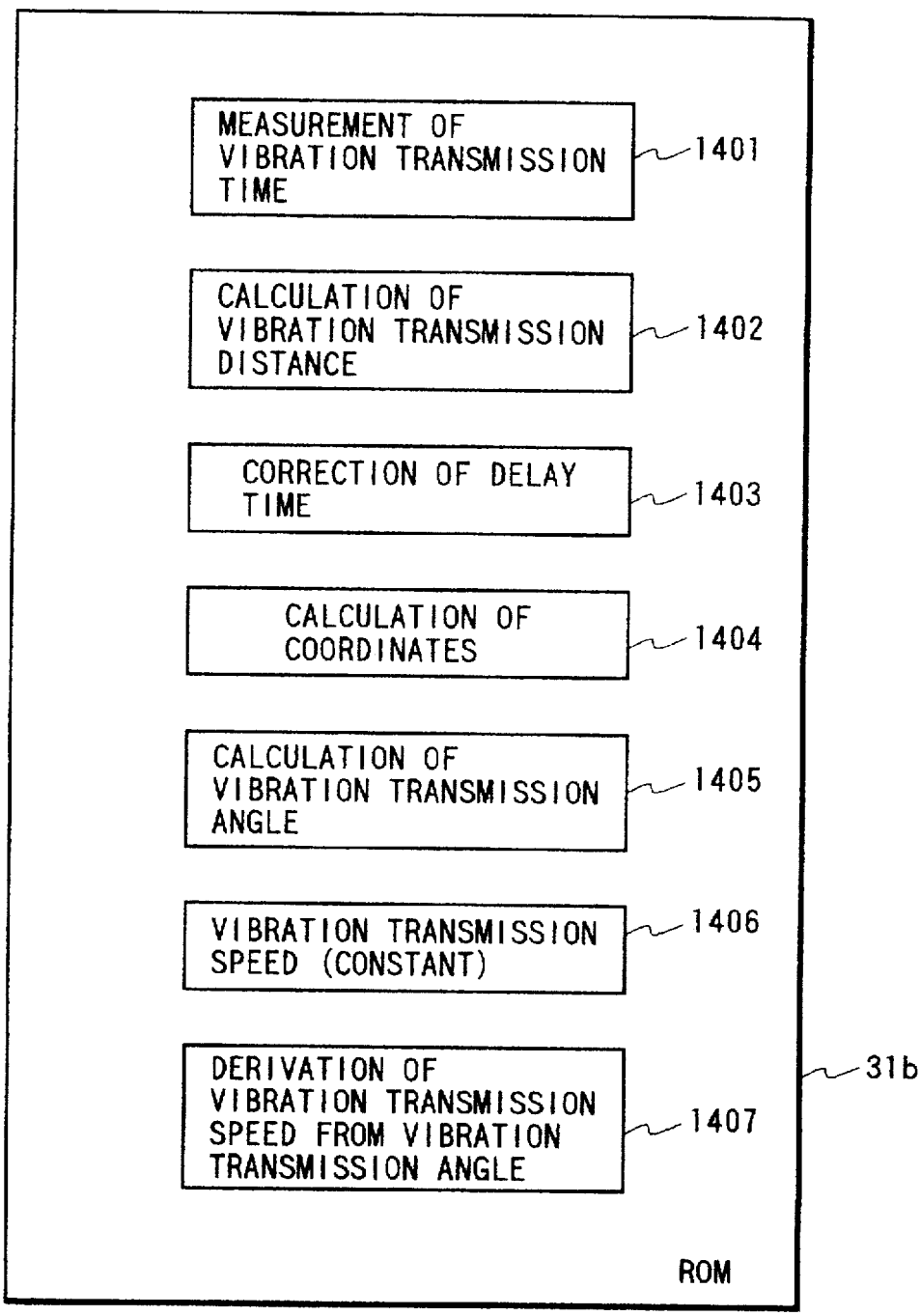
FIG. 24 is a conceptual diagram illustrating program code and a constant stored in a ROM of a microcomputer according to the third embodiment.

FIG. 24 is a conceptual diagram illustrating program code and constants that are stored in the ROM 31b in the microcomputer 31. A program module 1401 is used to measure a period from the time the vibrator pen 3 is driven via the vibrator driver 2, as previously described, until the vibrator sensors 6 detect the vibrations, i.e., the vibration transmission time. A program module 1402 is used to calculate a distance from the vibrator pen 3 to each vibration sensors 6 using the obtained vibration transmission time and a vibration transmission speed that is stored as a constant in a program module 1405. According to the present invention, in order to acquire tentative input coordinates, tentative distances from the vibrator pen 3 to the vibration sensors 6 are calculated, relative to the vibration transmission times that have been measured, by using a fixed constant that is stored in a program module 1406. Further, the vibration transmission speed is obtained from the vibration transmission angle by a program module 1407, and is employed to calculate the exact distances from the vibrator pen 3 to the individual vibration sensors 6 relative to the measured vibration transmission times. A program module 1403 is used to correct the acquired distances. A program module 1404 is employed to calculate vibration input coordinates by employing the obtained or corrected distances. The program modules 1403 and 1404 perform calculations to determine the tentative distances and the exact distances that are obtained by the program module 1402. The program module 1405 calculates vibration transmission angles from the vibrator pen 3 to the vibration sensors 6 using the tentative input coordinates that are acquired by the program module 1404. The program module 1407 employs the vibration transmission angles that are obtained by the program module 1404 to derive vibration transmission speeds that correspond to the vibration transmission angles.

<Calculation of vibration transmission distance (FIGS. 4 and 5)>

First, an explanation will be given for the principle for the acquisition of the time and the distance for the transmission of vibrations to each of the vibration sensors 6.

The vibration transmission time is measured based on the program module 1401, and the vibration transmission distance is calculated based on the program module 1402. FIG. 4 is a chart for explaining waveforms to be input to the waveform detector 9 and the processing for measuring the vibration transmission time in consonance with the waveforms. Although an explanation will be given of the processing for only the vibration sensor 6a, the same processing can be performed for the vibration sensors 6b through 6d.

The measurement of the time for the transmission of vibrations to the vibration sensor 6a is begun at the same time a start signal is output to the vibrator driver 2, as was previously described. At this time, a drive signal 41 is transmitted to the vibrator 4 by the vibrator driver 2. In response to the drive signal 41, supersonic vibrations are transmitted from the vibrator pen 3 to the vibration transmission plate 8. The vibrations advance for a period tg that correspond to the distance to the vibration sensor 6a, which thereafter detects the vibrations. A signal 42 in FIG. 4 describes an example waveform that is detected by the vibration sensor 6a.

Since a plate wave is employed for the vibrations in this embodiment, during the transmission of vibrations, the relations hip between an envelope 421 of a detected waveform and its phase 422 varies depending on the vibration transmission distance traversed across the vibration transmission plate 8. Assuming that the speed at which the envelope 421 advances, i.e., the group velocity, is defined as Vg, and the speed at which the phase advances, i.e., the phase velocity, is defined as Vp, determination of the distance between the vibrator pen 3 and the vibration sensor 6a can be performed by using the group velocity Vg and the phase velocity Vp.

First, for the envelope 421, when a specific point on a waveform, e.g., an inflection point or a peak point, such as a signal 43, is detected, distance d between the vibrator pen 3 and the vibration sensor 6 is acquired by expression (1):

$$d = Vg \cdot tg \qquad (1)$$

wherein Vg denotes the velocity of the envelope 421 and tg denotes the vibration transmission time. Although this expression represents the distance to the vibration sensor 6a, the distances to the vibration sensors 6b through 6d can be also represented by using the same expression. Further, the processing for the detection of a phase signal is performed in order to determine coordinates more accurately. Suppose that the period extending from a specific detection point for the phase waveform signal 422, e.g., the vibration input point, to a zero-cross point, where a predetermined signal level 46 has been exceeded, is defined as a signal tp 45 (a signal obtained by comparing the phase signal 422 with a window signal 44 having a specified width that has been generated relative to a signal 47). The distance d between the vibrator pen 3 and the vibration sensor 6 is represented by expression (2):

$$d = n \cdot \lambda p + Vp \cdot tp \qquad (2)$$

wherein λp denotes a wavelength of an elastic wave, and n is an integer.

From expressions (1) and (2), the integer n is represented by expression (3):

$$n = [(Vg \cdot tg - Vp \cdot tp)/\lambda p + 1/N] \qquad (3)$$

wherein N is any real number, other than 0, having an adequate value. With N=2 and the vibration transmission time tg having a wavelength of ±1/2, for example, n can be determined. By substituting n into expression (2), the distance between the vibrator pen 3 and the vibration sensor 6 can be accurately measured. The signals 43 and 45 are generated by the waveform detector 9 to measure the vibration transmission times tg and tp. The waveform detector 9 is arranged as is shown in FIG. 5.

FIG. 5 is a block diagram illustrating the structure of the waveform detector 9.

In FIG. 5, a signal output by the vibration sensor 6a is amplified at a predetermined level by a pre-amplifier 51. Extra frequency components of the signal obtained by amplification are removed by a band-pass filter 511. The resultant signal is transmitted to an envelope detector 52 that is constituted, for example, by an absolute value circuit and a low-pass filter, and only an envelope is extracted. The timing of the peak for the envelope is detected by an envelope peak detector 53. The detected timing for the envelope peak is transmitted to a Tg signal detector 54 that is constituted by a monostable multivibrator, etc. A detection signal Tg (signal 43 in FIG. 4), which is an envelope delay time detection signal having a predetermined waveform, is generated by the Tg signal detector 54, and is transmitted to the controller 1.

A signal detector 55 forms a pulse signal 47 for the portion that exceeds a threshold signal 46 at a predetermined level in the envelope signal 421, which is detected by the envelope detector 52. A monostable multivibrator 56 opens a gate signal 44, having a specified width, that has been triggered at the first leading edge of the pulse signal 47. A Tp comparator 57 detects a zero-cross point at the first leading edge of the phase signal 422 when the gate signal 44 is being opened, and supplies the phase delay time signal tp 45 to the controller 1. The above described circuits are provided for the vibration sensor 6a, and the same are provided for the other vibration sensors.

<Example correction of circuit delay time>

The vibration transmission time that is latched by the latch circuit includes circuit delay time et and phase offset time toff. An error generated by these times is included in the same amount in the vibrations when they are transmitted from the vibrator pen 3 through the vibration transmission plate 8 to the vibration sensors 6a through 6d. The distance from the origin O in FIG. 6 to the vibration sensor 6a is defined as R1 (=X/2). When vibrations are input by the vibrator pen 3 at the origin O, the actual measured times (the group delay time and the phase delay time) for the transmission of vibrations from the origin O to the vibration sensor 6a are defined as tgz' and tpz', and the true times for the transmission of vibrations from the origin O to the vibration sensor 6a are defined as tgz and tpz. Expressions (4) and (5) are established for the circuit delay time et and the phase offset time toff:

$$tgz' = tgz + et \qquad (4)$$

$$tpz' = tpz + et + toff \qquad (5).$$

On the other hand, expressions (6) and (7) are established for the actual measurement values tg' and tp' at an arbitrary input point:

$$tg' = tg + et \qquad (6)$$

$$tp' = tp + et + toff \qquad (7).$$

When differences between expressions (4) and (6) and between expressions (5) and (7) are calculated, the following expressions (8) and (9) are established:

$$tg' - tgz' = (tg + et) - (tgz + et) = tg - tgz \qquad (8)$$

$$tp' - tpz' = (tp' + et + toff) - (tpz + et + toff) \qquad (9).$$

The circuit delay time et and the phase offset time toff included in each vibration transmission time are removed. A true difference in the delay times for transmission between the location of the origin O and the input point P, beginning at the position of the vibration sensor 6a, can be acquired in consonance with the distance. As a result, the difference between the distances can be calculated from expressions (2) and (3).

Since the distance from the vibration sensor 6a to the origin O is stored in advance in nonvolatile memory, etc., and thus is known, the distance between the vibrator pen 3 and the vibration sensor 6a can be determined. The distances to the other vibration sensors 6b through 6d can be acquired in the same manner.

The actual measured values tgz' and tpz' relative to the origin O are stored in nonvolatile memory at the time of shipping. Based on the program module 1403, calculations for expressions (8) and (9) are performed before the calculation of expressions (2) and (3) so as to provide an accurate measurement.

<Explanation for determination of a constant relating to vibration transmission speed and for calculation of coordinates>

An explanation will now be given for the anisotropy of the vibration transmission plate and the locations of the vibration sensors, the determination of a constant for the vibration transmission speed, and the calculation of coordinates.

As previously mentioned, when a vibration transmission plate made of aluminum or another metal is employed, since the grain boundaries of the metal are aligned in a specific direction consonant with the direction in which the metal was rolled, the vibration transmission conditions vary depending on the vibration transmission direction, so that anisotropy occurs that causes the vibration transmission speed across the vibration transmission plate to be changed in consonance with the direction in which vibrations are transmitted. Anisotropy occurs not only in a metal plate, but also in a resin sheet, in consonance with the direction in which the sheet is stretched during the manufacturing process. Anisotropy also occurs when a vibration transmission plate is fabricated by attaching a resin sheet to another plate member. A resin sheet vibration transmission plate is also anisotropic.

In this embodiment, the coordinate input device employs a vibration transmission plate 8 for which vibration transmission speeds differ depending on the vibration transmission direction. Currently available plate members are anisotropic more or less because of the above condition encountered during the manufacturing process. Especially in general production for employment with many applications is a low anisotropic glass plate on which a highly anisotropic resin plate is laminated to prevent dispersion. For were a low anisotropic plate member to be used alone as a vibration transmission plate, special materials, such as those employed to reinforce the strength of a material that is not subjected to rolling, would be required, and accordingly, manufacturing costs would be increased.

Figure 20:
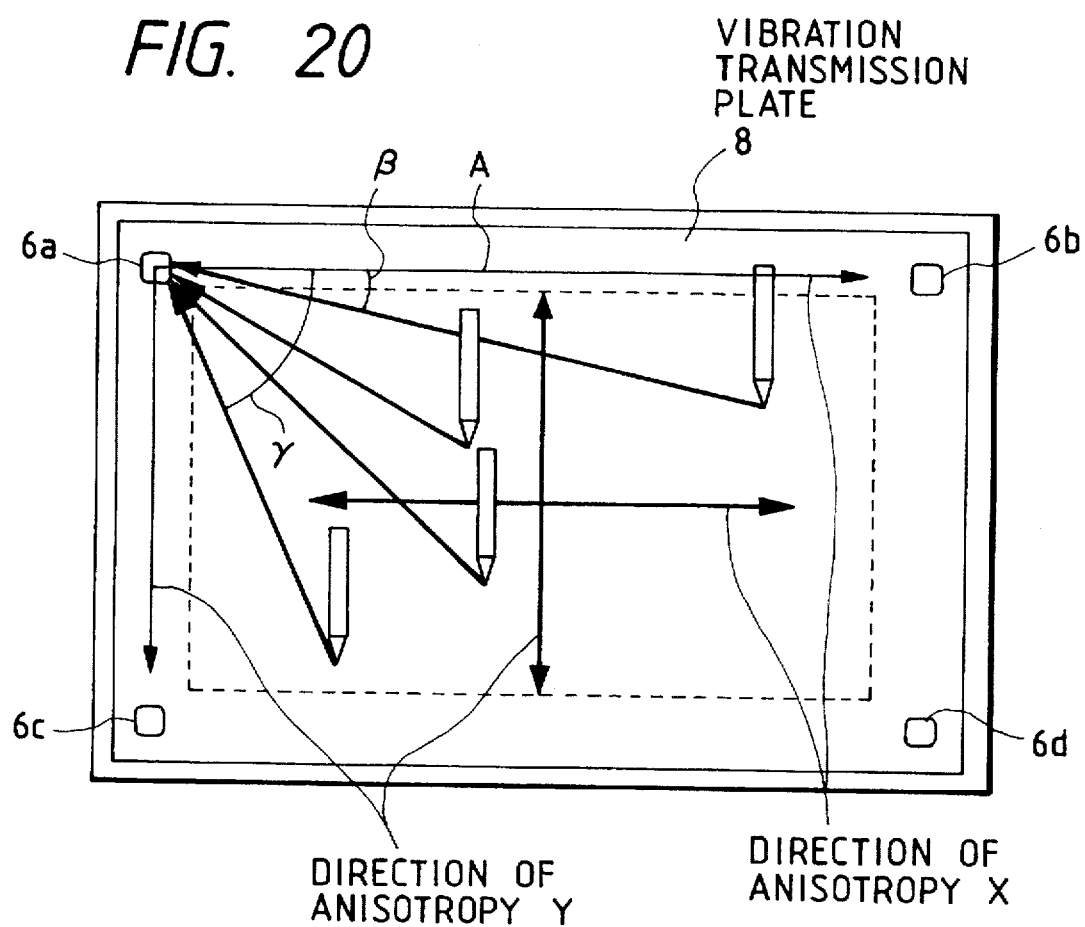
FIG. 20 is an explanatory diagram of the anisotropy of a vibration transmission plate, the locations of vibration sensors, and a constant determination method according to the third embodiment.

As was briefly explained while referring to FIG. 19, this embodiment relates to the determination of constants and the calculation of coordinates when a vibration transmission plate 8 having anisotropic properties is employed, as is shown in FIG. 20.

As was previously described in <Calculation of vibration transmission distance>, to calculate the distances between the vibrator pen 3 and the vibration sensors 6a through 6d, the vibration transmission speeds, i.e., the group velocity Vg and the phase velocity Vp, must be acquired in advance as constant values. According to this invention, when a vibration transmission plate 8 having the anisotropic properties is employed, the vibration transmission speed varies depending on the vibration transmission angle, and the distance between the vibrator pen 3 and the vibration sensor 6 can be calculated exactly by using the vibration transmission speed corresponding to the vibration transmission angle, so that the vibration input coordinates can be acquired.

Figure 26:
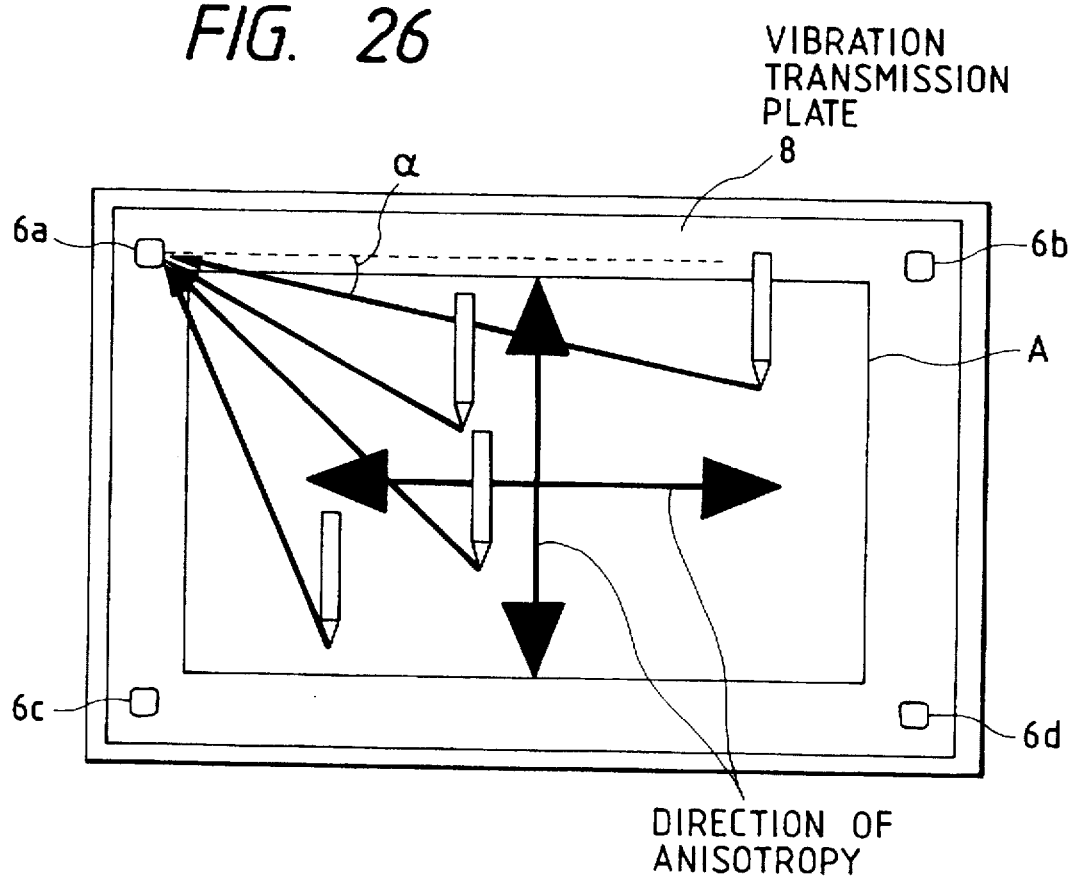
FIG. 26 is an explanatory diagram for prior art.
Figure 27:
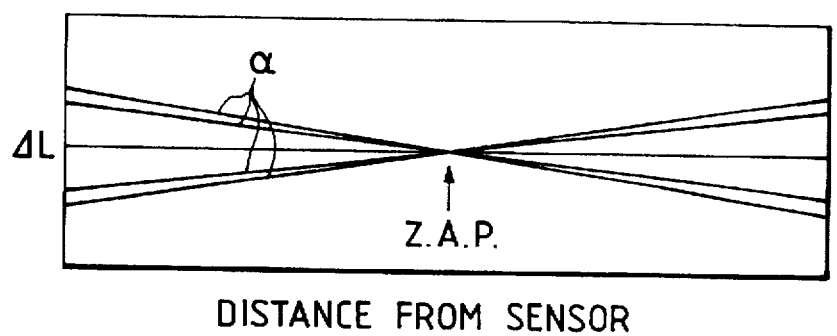
FIG. 27 is an explanatory diagram for the prior art.

As is described while referring to FIG. 26, for a vibration transmission plate 8 having anisotropic properties, the vibration transmission speed differs in consonance with the vibration transmission path from the vibrator pen 3 to the vibration sensor 6. The vibration transmission speed is determined by an incident vibration transmission angle extending from the vibrator pen 3 to the vibration sensor 6. In FIG. 20 is shown a vibration transmission plate 8 for which the axes of the anisotropy extend in the directions X and Y. The vibration transmission speed in the direction X is defined as x, and the vibration transmission speed in the direction Y is defined as y. In such a vibration transmission plate, x or y is either the maximum value or the minimum value for the vibration transmission speed. If x is the maximum value for the vibration transmission speed while y is the minimum value, the vibration transmission speed V, at which the vibration is passed along the transmission path from the vibrator pen 3 to the vibration sensor 6, is $x \geq V \geq y$, and is determined by an angle (vibration transmission angle) formed with a line corresponding to direction X (or Y). As is apparent, the vibration transmission speeds $V\beta$ and $V\gamma$ for the vibration transmission angles $\beta$ and $\gamma$ ($\beta < \gamma$) are $V\beta > V\gamma$. More specifically, supposing that the vibration transmission angle is $\alpha$, then the vibration transmission speed V that is consonant with its vibration transmission path can be acquired as $V=G(\alpha)$ by using derivation function G. Vibration transmission speed data for which the vibration transmission angle is changed are prepared relative to the vibration transmission plate 8 having the anisotropic properties, and the derivation function G may be acquired by using the data. The vibration transmission speed is measured by scanning with the vibrator pen on a stage, but another method may be employed for the measurement. To provide correlation between the vibration transmission angle and the vibration transmission speed, in addition to the employment of the derivation function G, a table may be used in which are entered in advance the vibration transmission speeds for the individual vibration transmission angles.

Figure 21:
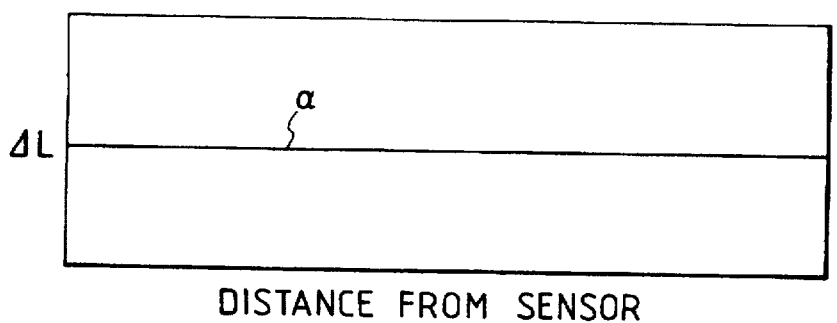
FIG. 21 is an explanatory diagram of the anisotropy of a vibration transmission plate, the locations of vibration sensors, and a constant determination method according to the third embodiment.

According to this embodiment, first, the vibration transmission angle is acquired for each vibration sensor 6. The vibration transmission speed that is consonant with the vibration transmission path to the sensor is derived from the vibration transmission angle. The distance from the vibrator pen 3 to each vibration sensor 6 is calculated by using the vibration transmission speed. Therefore, the exact distance with only a slight error $\Delta L$ is obtained, as is shown in FIG. 21.

Figure 22:
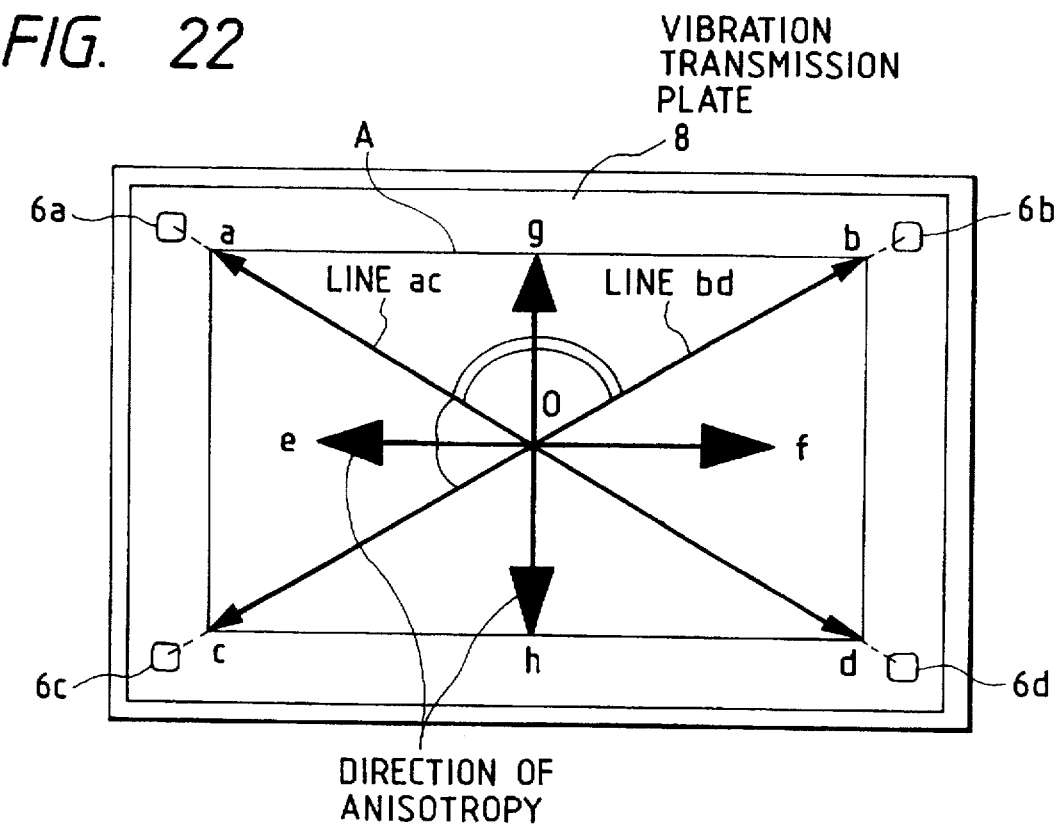
FIG. 22 is an explanatory diagram of the anisotropy of the vibration transmission plate, the locations of the vibration sensors, and the constant determination method according to the third embodiment.

Further, the position of the vibration transmission plate 8 is adjusted so that the two intersecting axes of anisotropy of the plate 8 are aligned along the bisectors of the angles that are formed by two line segments that respectively connect the diagonally positioned vibration sensors 6a and 6d, and 6b and 6c. As an example, refer to the vibration transmission plate 8 shown in FIG. 22, at the four corners of which the four vibration sensors 6a through 6d are respectively located. Two line segments that connect the diagonal vibration sensors 6a and 6d, and 6b and 6c are defined as lines ad and bc. Lines indicating the directions of anisotropy of the vibration transmission plate 8 are defined as lines ef and gh, and their intersection point is defined as point o. The direction of the vibration transmission plate 8 is adjusted so that the lines ef and gh for the axes of anisotropy are aligned along the bisectors of the angles that are formed by the lines ad and bc, i.e., $\angle aoc$ and $\angle aob$. In other words, the vibration transmission plate 8 is placed so that $\angle aoe = \angle coe$, and $\angle aog = \angle bog$.

Figure 23:
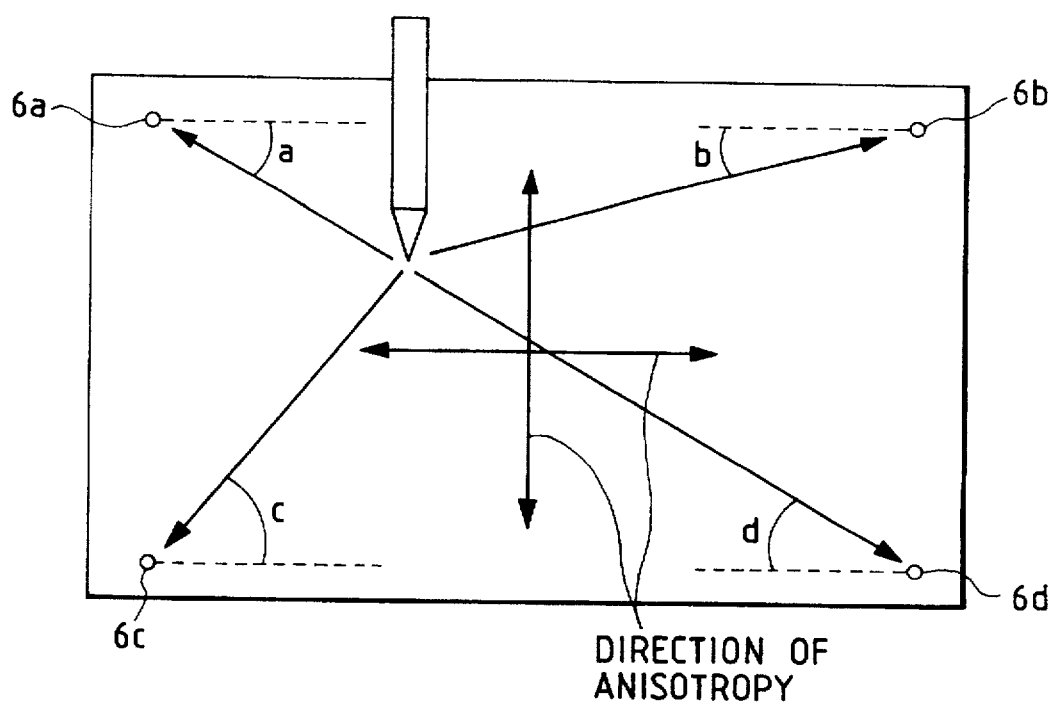
FIG. 23 is an explanatory diagram of the anisotropy of the vibration transmission plate, the locations of the vibration sensors, and the constant determination method according to the third embodiment.

With this arrangement of the vibration sensors and the above described directions of the anisotropy, since the lines eg and gh for the axes of anisotropy correspond to the bisectors of the angles that are formed by the lines ad and bc, the angles that are formed by the lines ad and bc and the axial line eg, or by the lines ad and bc and the axial line gh, are equal, and the vibration transmission characteristic is therefore equivalent. Therefore, if the vibration transmission angles concerning the vibration sensors are defined as angles that are formed by the axial direction X of anisotropy, as is shown in FIG. 23, the vibration transmission angles for the vibration sensors 6a through 6d when input with the vibrator pen 3 is instructed are angles a through d, respectively. Based on the vibration transmission angles, the vibration transmission speed V that is consonant with the vibration transmission paths can be acquired by using the derivation function G, which is used in common for the vibration sensors 6.

The method for calculating the vibration transmission angle for each vibration sensor will now be described. In this embodiment, first, the tentative distance from the vibrator pen 3 to the vibration sensor 6 is calculated using the vibration transmission time that has been measured by employing the fixed constant. The tentative input coordinates are then acquired based on the tentative distance, and are used to calculate the vibration transmission angle from the vibrator pen 3 to the vibration sensor 6. The fixed constant is, for example, the average value of the speeds for vibration transmission to the diagonally located vibration sensors in the effective area A. As is evident, since this constant is employed to obtain the tentative coordinate value, another constant, such as the vibration transmission speed for a specific vibration sensor, may be employed. A vibration transmission speed, which is shifted from the actual vibration transmission speed that corresponds to the direction in which the point designated by the vibrator pen 3 and the vibration sensor 6 are connected to each other, is employed as a constant to calculate the distance. Although an obtained coordinate value includes an error that is equivalent to the shift, this value is satisfactory as a tentative coordinate value that is required for calculating the vibration transmission angle. The vibration transmission angle can be easily acquired from the tentative coordinate value by the following expression:

vibration transmission angle $\alpha = \tan^{-1}((j-h)/(k-i))$ wherein the coordinates of the vibration sensor 6a are defined by (h, i) and the point designated by the vibrator pen 3 is defined as (j, k). Another method may be employed for calculating the vibration transmission angle.

The above described determination of a constant for the vibration transmission speeds and the calculation of coordinates will now be explained in a time series while referring to FIG. 24. First, the measurement of the time for vibration transmission from the vibrator pen 3 to each of the vibration sensors 6 is begun by the program module 1401. Then, relative to the measured vibration transmission times, the tentative distances from the vibrator pen to the vibration sensors 6 are calculated by the program module 1402 using the fixed constant that is stored in the program module 1406. Correction of the thus obtained distances is performed by the program module 1403.

Following this, the tentative vibration input coordinates are calculated by the program module 1404 using the distances to the vibration sensors 6 that have been acquired or corrected. The tentative input coordinates are employed by the program module 1405 to calculate the vibration transmission angles from the vibrator pen 3 to the individual vibration sensors 6. Sequentially, the vibration transmission angles that have been acquired by the program module 1405 are employed by the program module 1407 to derive corresponding vibration transmission speeds.

Then, the vibration transmission speeds that correspond to the vibration transmission angles for the vibration sensors 6 are again employed by the program module 1402 to calculate the exact distances from the vibrator pen 3 to the vibration sensors 6, relative to the vibration transmission times. Correction of the obtained distances is performed by the program module 1403. Based on the acquired/corrected distances for the vibration sensors 6, more accurate vibration input coordinates are calculated by the program module 1404. The above described processing is repeated for the predetermined drive cycle. As is apparent, the program modules 1402, 1403 and 1404, which are repeatedly employed for each process, control the loop by setting a flag.

Since the vibration transmission times measured by the program modules 1401 are repeatedly used, these results may be stored, for example, in a program module 1401' (not shown) and may be extracted when necessary.

In the above embodiment, the vibration transmission plate 8 is so placed that the two intersecting axes of the anisotropy of the plate 8 are aligned with the bisectors of the angles, which are formed by two line segments that connect the respective diagonally opposite vibration sensors 6a and 6d, and 6b and 6c. However, the positioning for the vibration transmission plate 8 is not limited to this, so that it is possible to realize the object of the present invention that the exact distance can be calculated using the vibration transmission speed that is consonant with the vibration transmission path. Whatever the directions of anisotropy of the vibration transmission plate may be, a function or a table for correlation of the vibration transmission angles and the vibration transmission speeds for each vibration sensor may be provided, in the program module 1407, that are in consonance with the directions of the anisotropy of the vibration transmission plate 8. Only correlation for each of the vibration sensors 6 may be performed by using the table.

For the same reason, the positioning of the vibration sensors is not limited to the above described arrangement, where they are located at the four corners of the vibration transmission plate. For example, the vibration sensors may be arranged in the shape of a cross on the vibration transmission plate and in the effective area, instead of at the four corners, and exact distances can be obtained by using the vibration transmission speeds that are consonant with the vibration transmission paths.

<Calculation of coordinate position (FIG. 6)>

An explanation will now be given, while referring to FIG. 6, of the principle involved in the detection of the coordinate location on the vibration transmission plate 8 at which vibrations are input by the vibrator pen 3.

The expression for calculating the coordinates is obtained by using the Pythagorean theorem.

In the arrangement where the vibration sensors 6a, 6b and 6c are positioned as shown in FIG. 1, the linear distances da, db and dc from position P of the vibrator pen 3 to the vibration sensors 6a through 6c can be obtained by applying the previously mentioned principle. Based on the acquired linear distances da, db and dc, the controller 1 calculates the coordinates P(x, y) at which the vibrator pen 3 is in contact with the vibration transmission plate 8 by using expressions (10) and (11):

$$x = X/2 + (da+db) \cdot (da-db)/2X \quad (10)$$

$$y = Y/2 + (da+dc) \cdot (da-dc)/2Y \quad (11)$$

wherein X and Y denote respectively distances between the vibration sensors 6a and 6b and between the vibration sensors 6a and 6c.

In this manner, the coordinates for the position of the vibrator pen 3 can be detected in real time.

[Fourth Embodiment]

Figure 25:
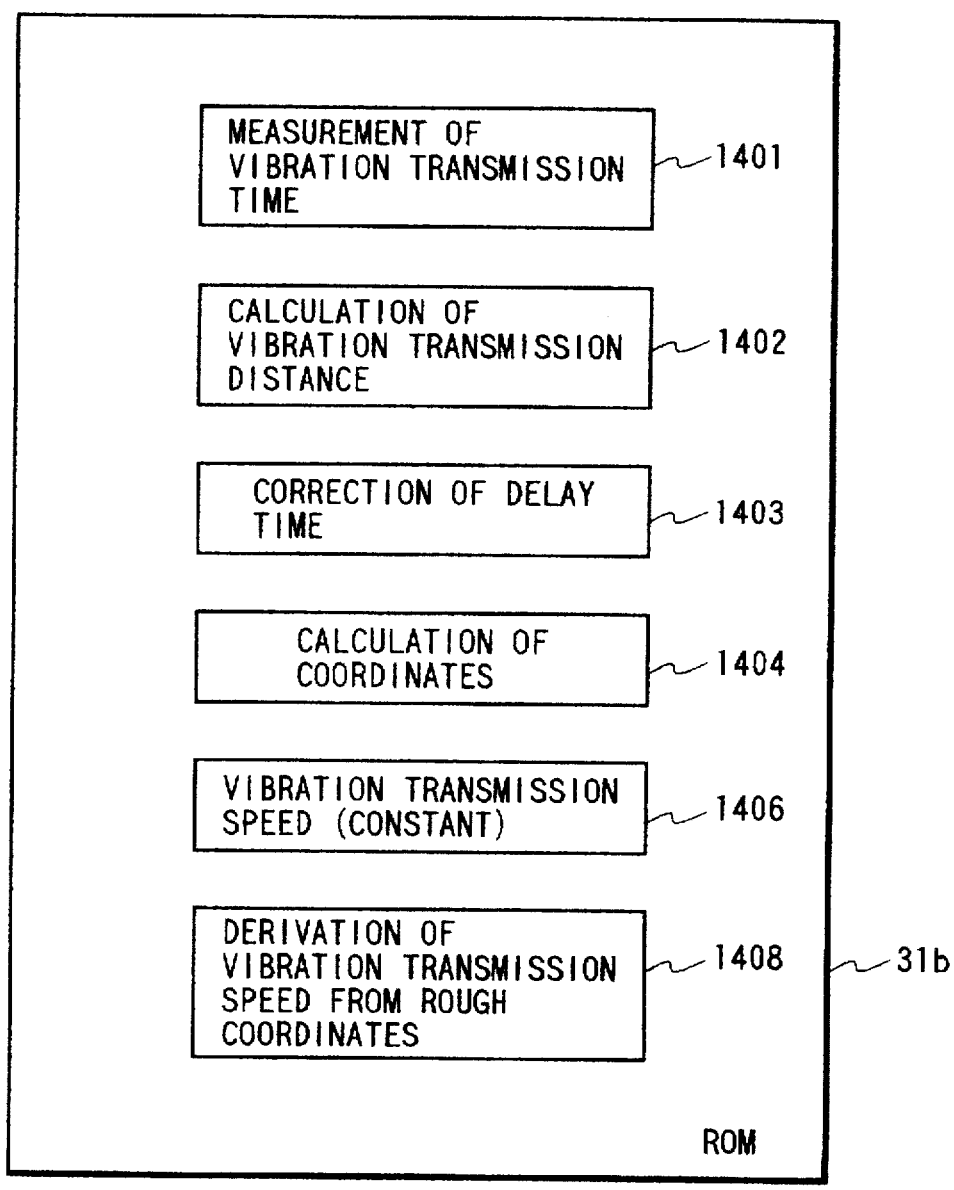
FIG. 25 is a diagram for explaining a fourth embodiment of the present invention.

In the third embodiment, the vibration transmission angle from the vibrator pen 3 to the vibration sensor 6 has been acquired using tentative input coordinates, and is used to derive corresponding vibration transmission speeds. The vibration transmission speed to each vibration sensor may be obtained directly from the tentative input coordinates. FIG. 25 is a conceptual diagram illustrating program code and constants that are stored in a ROM 31b in a microcomputer 31. A program module 1401 is used to measure a period from the time the vibrator pen 3 is driven via the vibrator driver 2, as previously described, until the vibrator sensors 6 detect the vibrations, i.e., the vibration transmission time. A program module 1402 is used to calculate a distance from the vibrator pen 3 to each vibration sensor 6 using the obtained vibration transmission time and a vibration transmission speed that is stored as a constant in a program module 1405. According to this fourth embodiment, in order to acquire tentative input coordinates, tentative distances from the vibrator pen 3 to the vibration sensors 6 are calculated, relative to the vibration transmission times that have been measured, by using a fixed constant that is stored in a program module 1406. Further, the vibration transmission speeds derived from the tentative input coordinates are employed by a program module 1408 to calculate the exact distances from the vibrator pen 3 to the individual vibration sensors 6, relative to the measured vibration transmission times. A program module 1403 is used to correct the acquired distances. A program module 1404 is employed to calculate vibration input coordinates from the obtained or corrected distances. The program modules 1403 and 1404 perform calculations to determine the tentative distances and the exact distances that are obtained by the program module 1402. The program module 1405 calculates vibration transmission angles from the vibrator pen 3 to the vibration sensors 6 using the tentative input coordinates that are acquired by the program module 1404. The program module 1408 employs the tentative input coordinates that are obtained by the program module 1404 to acquire vibration transmission speeds from the vibrator pen 3 to the vibration sensors. The correlation table, for input coordinate values and vibration transmission speeds from the vibrator pen 3 to the vibration sensors 6, is stored in the program module 1408 to correlate an input coordinate value directly with a vibration transmission speed without examining a vibration transmission angle. A correlation table where vibration transmission speed is allocated for each of several regions in the effective area may be employed.

The above described determination of a constant for the vibration transmission speeds and the calculation of coordinates will now be explained in a time series while referring to FIG. 25. First, the measurement of the time for vibration transmission from the vibrator pen 3 to each of the vibration sensors 6 is begun by the program module 1401. Then, relative to the measured vibration transmission times, the tentative distances from the vibrator pen 3 to the vibration sensors 6 are calculated by the program module 1402 using the fixed constant that is stored in the program module 1406. Correction of the thus obtained distances is performed for by the program module 1403.

Following this, the tentative vibration input coordinates are calculated by the program module 1404 using the distances to the vibration sensors 6 that have been acquired or corrected. The tentative input coordinates are employed by the program module 1408 to calculate the vibration transmission speeds that correspond to the vibration transmission paths from the vibrator pen 3 to the individual vibration sensors 6. Then, the vibration transmission speeds that correspond to the vibration transmission paths are again employed by the program module 1402 to calculate the exact distances from the vibrator pen 3 to the vibration sensors 6, relative to the vibration transmission times. Correction of the obtained distances is performed by the program module 1403. Based on the acquired/corrected distances for the vibration sensors 6, more accurate vibration input coordinates are calculated by the program module 1404. The above described processing is repeated for the predetermined drive cycle. As is apparent, the program modules 1402, 1403 and 1404, which are repeatedly employed for each process, control the loop by setting a flag. Since the vibration transmission times measured by the program modules 1401 are repeatedly used, these results may be stored, for example, in a program module 1401' (not shown) and may be extracted when necessary.

Since the speeds for vibration transmission to the vibration sensors are acquired directly using the tentative input coordinates, the load applied on the ROM $31b$ in the microcomputer 31 can be reduced and the processing speed can be increased.

[Fifth Embodiment]

In the above embodiments, the tentative distances have been calculated by using a fixed constant. A vibration transmission speed is calculated, using a corresponding vibration transmission angle or directly, by employing the tentative input coordinates. And the coordinates are again calculated by using the obtained vibration transmission speed. However, the processing may be repeated for the calculation of a vibration transmission speed, using a corresponding vibration transmission angle or directly, by employing the results of the coordinate calculation, and for the calculation of the coordinate, which is again performed by using the acquired vibration transmission speed. Through this repetitive processing, based on more exact input coordinates, a vibration transmission speed can be obtained more accurately, by employing an exact vibration transmission angle or directly. As a result, accurate input coordinates can be acquired.

The present invention can be applied to a system that is constituted by a plurality of devices or an apparatus that includes a single device. It is evident that the object of the present invention can be achieved by, in association with the locations of the vibration sensors, providing a storage medium, for a system or an apparatus, in which is stored software program code, for accomplishing the functions in the above embodiments, that a computer (or a CPU or an MPU) of the system or the apparatus can read and execute.

In this case, since, in association with the locations of the vibration sensors, the program code that has been read from the storage medium accomplishes the novel function provided by the present invention, the storage medium in which that program code is stored constitutes the present invention.

As is described above, according to the present invention, the vibration transmission angle from the vibrator pen to the vibration detection means is calculated from the tentative coordinates that are measured using a fixed constant. The coordinate position is calculated by using vibration transmission speeds that are derived from the obtained vibration transmission angle. Therefore, accurate coordinates can be acquired while taking the anisotropic properties of the vibration transmission plate into consideration.

The coordinates can be detected in real time.

Since the times for vibration transmission to the individual vibration detection means are acquired directly from the tentative input coordinates, the processing speed can be increased.

More accurate input coordinates can be obtained by repeating the processing.

What is claimed is:

1. A coordinate input device, which obtains a vibration input location based on times required for transmission of vibrations across a vibration transmission plate having anisotropic properties, comprising:

transmission time measurement means, including a first pair of vibration sensors and a second pair of vibration sensors located opposite each other on said vibration transmission plate, for measuring times required for transmission of vibrations from said vibration input location to each of said vibration sensors;

transmission speed storing means for storing a first vibration transmission speed and a second vibration transmission speed at which said vibrations are transmitted across said vibration transmission plate;

distance calculation means for calculating distances between said vibration input location and said locations of each of said first pair of vibration sensors, by employing said time required for vibration transmission, which is obtained for each of said first vibration sensors, and said first vibration transmission speed, and for calculating distances between said vibration input location and said locations of each of said second pair of vibration sensors, by employing said time for vibration transmission, which is obtained for each of said second vibration sensors, and said second vibration transmission speed; and coordinate calculation means for calculating said vibration input location from said distances that are acquired.

2. A coordinate input device according to claim 1, wherein said vibration transmission plate is formed in a rectangular shape, and wherein said vibration sensors are respectively located at four corners of said vibration transmission plate.

3. A coordinate input device according to claim 2, wherein said vibration sensors are piezoelectric devices.

4. A coordinate input device according to claim 3, further comprising:

drive means for driving a first vibration sensor of said first pair of vibration sensors and a first vibration sensor of said second pair of vibration sensors to respectively generate vibrations;

sensor distance holding means for holding a distance between said first vibration sensor and a second vibration sensor of said first pair of vibration sensors, and a distance between said first vibration sensor and a second vibration sensor of said second pair of vibration sensors;

sensor vibration transmission time measuring means for measuring a first sensor vibration transmission time required for said vibrations generated by said first vibration sensor of said first pair of vibration sensors to arrive at said second vibration sensor of said first pair of vibration sensors, and a second sensor vibration transmission time required for said vibrations generated by said first vibration sensor of said second pair of vibration sensors to arrive at said second vibration sensor of said second pair of vibration sensors; and vibration transmission speed calculation means for calculating said first vibration transmission speed by using said distance between said first and said second vibration sensors of said first pair of vibration sensors and said first sensor vibration transmission time, and for calculating said second vibration transmission speed by using said distance between said first and second vibration sensors of said second pair of vibration sensors and said second sensor vibration transmission time.

5. A coordinate input device according to claim 1, wherein said vibration sensors are piezoelectric devices.

6. A coordinate input device according to claim 5, further comprising:

drive means for driving a first vibration sensor of said first pair of vibration sensors and a first vibration sensor of said second pair of vibration sensors to respectively generate vibrations;

sensor distance holding means for holding a distance between said first vibration sensor and a second vibration sensor of said first pair of vibration sensors, and a distance between said first vibration sensor and a second vibration sensor of said second pair of vibration sensors;

sensor vibration transmission time measuring means for measuring a first sensor vibration transmission time required for said vibrations generated by said first vibration sensor of said first pair of vibration sensors to arrive at said second vibration sensor of said first pair of vibration sensors, and a second sensor vibration transmission time required for said vibrations generated by said first vibration sensor of said second pair of vibration sensors to arrive at said second vibration sensor of said second pair of vibration sensors; and vibration transmission speed calculation means for calculating said first vibration transmission speed by using said distance between said first and said second vibration sensors of said first pair of vibration sensors and said first sensor vibration transmission time, and for calculating said second vibration transmission speed by using said distance between said first and second vibration sensors of said second pair of vibration sensors and said second sensor vibration transmission time.

7. A coordinate input device, wherein vibrations are input, by a vibration generation source, on a vibration transmission plate having anisotropic properties whereby a vibration transmission speed is varied in consonance with a vibration transmission direction, and wherein is measured a time required for said vibrations to be transmitted, across said vibration transmission plate, from said vibration generation source to vibration detection means in order to acquire coordinates for said vibration generation source, comprising:

first calculation means for calculating tentative coordinates based on a vibration transmission speed that is stored as a fixed value;

derivation means for deriving vibration transmission angles to said vibration detection means from said tentative coordinates obtained by said first calculation means; and second calculation means for acquiring vibration transmission distances by performing calculations using said vibration transmission angles derived by said derivation means, and for acquiring said coordinates for said vibration generation source by performing calculations using said vibration transmission distances.

8. A coordinate input device according to claim 7, wherein said vibration is transmitted as a plate wave across said vibration transmission plate.

9. A coordinate input device according to claim 7, wherein said vibration transmission angles are formed by the direction in which said vibrations are transmitted from said vibration generation source to said vibration detection means and directions associated with said anisotropic properties.

10. A coordinate input device according to claim 7, wherein said vibration transmission plate and said vibration detection means are so positioned that axes of directions associated with said anisotropic properties, of said vibration transmission plate, are aligned along bisectors of angles formed by two line segments that respectively connect two of said vibration detection means that face each other.

11. A control method for a coordinate input device, wherein vibrations are input, by a vibration generation source, on a vibration transmission plate having anisotropic properties whereby a vibration transmission speed is varied in consonance with a vibration transmission direction, and wherein is measured a time required for said vibrations to be transmitted, across said vibration transmission plate, from said vibration generation source to vibration detection means in order to acquire coordinates for said vibration generation source, comprising:

- a first calculation step of calculating tentative coordinates based on a vibration transmission speed that is stored as a fixed value;
- a derivation step of deriving vibration transmission angles to said vibration detection means from said tentative coordinates obtained at said first calculation step; and
- a second calculation step of acquiring vibration transmission distances by performing calculations using said vibration transmission angles derived at said derivation step, and of acquiring said coordinates for said vibration generation source by performing calculations using said vibration transmission distances.

12. A control method for a coordinate input device according to claim 11, wherein said vibrations are transmitted as a plate wave across said vibration transmission plate.

13. A control method for a coordinate input device according to claim 11, wherein said vibration transmission angles are formed by the direction in which said vibrations are transmitted from said vibration generation source to said vibration detection means and directions associated with said anisotropic properties.

14. A control method for a coordinate input device according to claim 11, wherein said vibration transmission plate and said vibration detection means are so positioned that axes of directions associated with said anisotropic properties, of said vibration transmission plate, are aligned along bisectors of angles formed by two line segments that respectively connect two of said vibration detection means that face each other.

15. A storage medium in which is stored a computer executable program, said program comprising:

- a first calculation step of calculating tentative coordinates based on a vibration transmission speed that is stored as a fixed value;
- a derivation step of deriving vibration transmission angles to vibration detection means from tentative coordinates obtained at said first calculation step; and
- a second calculation step of acquiring vibration transmission distances by performing calculations using said vibration transmission angles derived at said derivation step, and of acquiring said coordinates for a vibration generation source by performing calculations using vibration transmission distances.

* * * * *

UNITED STATES PATENT AND TRADEMARK OFFICE
CERTIFICATE OF CORRECTION

PATENT NO. : 5,761,087
DATED : June 2, 1998
INVENTOR(S) : YUICHIRO YOSHIMURA, et al.

It is certified that error appears in the above-identified patent and that said Letters Patent is hereby corrected as shown below:

COLUMN 3

Line 22, "by a" should read --by $\alpha$--.

COLUMN 10

Line 7, "(9)" should read --(9).--.

COLUMN 17

Line 34, "i s" should read --is--.

Line 42, "circuit s" should read --circuits--.

COLUMN 18

Line 24, "ed" should be deleted, and "us" should read --used--.

Line 65, "relations hip" should read --relationship--.

UNITED STATES PATENT AND TRADEMARK OFFICE
CERTIFICATE OF CORRECTION

PATENT NO. : 5,761,087
DATED : June 2, 1998
INVENTOR(S) : YUICHIRO YOSHIMURA, et al.

It is certified that error appears in the above-identified patent and that said Letters Patent is hereby corrected as shown below:

Column 18:

Line 65, "relations hip" should read --relationship--.

Signed and Sealed this

Twenty-sixth Day of January, 1999

Attest:

Attesting Officer

Acting Commissioner of Patents and Trademarks